(12) United States Patent
Johnson et al.

(10) Patent No.: US 7,254,581 B2
(45) Date of Patent: Aug. 7, 2007

(54) SYSTEM AND METHOD FOR CREATION AND MAINTENANCE OF A RICH CONTENT OR CONTENT-CENTRIC ELECTRONIC CATALOG

(76) Inventors: Jerry Johnson, 18318 Steele Point, Crosby, TX (US) 77532; Chris Kluczyk, 2727 Elmside Dr. #321, Houston, TX (US) 77042; Raul Rom, 9114 Godstone La., Spring, TX (US) 77379

(*) Notice: Subject to any disclaimer, the term of this patent is extended or adjusted under 35 U.S.C. 154(b) by 534 days.

(21) Appl. No.: 10/705,923

(22) Filed: Nov. 13, 2003

(65) Prior Publication Data
US 2005/0060324 A1    Mar. 17, 2005

Related U.S. Application Data

(60) Provisional application No. 60/425,724, filed on Nov. 13, 2002.

(51) Int. Cl.
*G06F 17/00* (2006.01)
*G06F 7/00* (2006.01)
(52) U.S. Cl. .................. 707/100; 707/101; 707/102; 707/104.1
(58) Field of Classification Search .......... 707/2, 707/3, 10, 100–103 R, 104.1, 200; 709/203, 709/217, 218, 224; 715/513, 744; 705/26, 705/27
See application file for complete search history.

(56) References Cited

U.S. PATENT DOCUMENTS

| | | | |
|---|---|---|---|
| 5,319,542 A * | 6/1994 | King et al. .................. 705/27 |
| 5,544,360 A * | 8/1996 | Lewak et al. ................. 707/1 |
| 5,715,444 A | 2/1998 | Danish et al. |
| 5,768,581 A | 6/1998 | Cochran |
| 5,983,219 A | 11/1999 | Danish et al. |
| 5,995,979 A | 11/1999 | Cochran |
| 6,023,683 A * | 2/2000 | Johnson et al. ............... 705/26 |
| 6,026,398 A * | 2/2000 | Brown et al. .................. 707/5 |
| 6,233,586 B1 * | 5/2001 | Chang et al. ........... 707/103 R |
| 6,275,821 B1 | 8/2001 | Danish et al. |
| 6,327,588 B1 | 12/2001 | Danish et al. |
| 6,697,799 B1 | 2/2004 | Neal et al. |
| 6,988,095 B1 * | 1/2006 | Dorfman ........................ 707/3 |
| 7,035,862 B2 * | 4/2006 | Patitucci ..................... 707/101 |
| 7,043,492 B1 * | 5/2006 | Neal et al. .................. 707/101 |
| 7,113,917 B2 * | 9/2006 | Jacobi et al. ................. 705/14 |

OTHER PUBLICATIONS

Saqqara Webcast "Product Content Management—User Supplier Content to Drive Buyer Product Selection", (Feb. 28, 2001).

(Continued)

*Primary Examiner*—Jeffrey Gaffin
*Assistant Examiner*—Jacques Veillard
(74) *Attorney, Agent, or Firm*—Cha & Reiter, LLC

(57) ABSTRACT

A system and method are disclosed for transforming catalog data from multiple supplier sources to a standardized rich content catalog either by the suppliers themselves or by a third party using the system and method of the present invention. Incoming raw catalog data content is cleansed and normalized using an extensive knowledge base of patterns and incoming schemas are appended to the cleansed and normalized data. The resulting rich content catalogs are published for user browsing and data syndication. Users are administered to form groups for purposes of shopping, product pricing, and access authorization.

57 Claims, 6 Drawing Sheets

OTHER PUBLICATIONS

Saqqara Webcast "Product Content and Transformation and Exchance—Unlocking Supplier Content for Effective B2B e-Commerce", (Feb. 21, 2001).

Saqqara Webcast Notes "The Role of Content in the Connected World", Gartner Presentation, http://manufacturingsystems.com/seminar/062001archive2.asp (Jun. 20, 2001).

Saqqara CommerceSuite™ (2001).

SaqqaraContentWorks ™ (2001).

Saqqara Catalog Management Service for e-Procurement (2002).

B2B Sell-Side (Hosted) Comparison (Jun. 24, 2001).

B2B Buy-Side E-Procurement Comparison (Mar. 18, 2002).

* cited by examiner

Legacy Input

| Supplier Part Number | Manufacturer | Manufacturer Part Number | Category 1 | Noun | Modifier | Char 1 | Val 1 |
|---|---|---|---|---|---|---|---|
| 78909195325 | AMP | 406372-2 | Data Comm | CONNECTOR | COMM | TYPE | JACK, MODULAR |
| Char 2 | Val 2 | Char 3 | Val 3 | Char 4 | Val 4 | Char 5 | Val 5 |
| CONDUCTOR | 26-20 AWG SOL/STR | POSITION | 8 | COLOR | BLACK | ADD'T'N'L DETAIL | ENHANCED CATEGORY 5,RJ45, UNIVERSAL 110 F/ T568A & T568B WIRING SCHEMES |

FIG. 4a

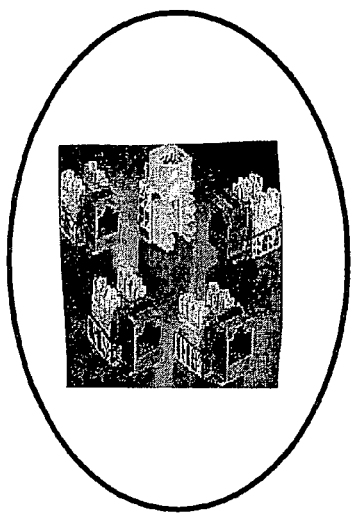

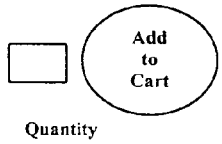

Quantity

Product Description

110 Modular Jack Assembly, RJ145, Universal, Category 5, Modular Plugs and Jacks, Cabl Mounted Jacks, Brand: AMP, F/T568A & T568b Wiring Schemes, Package Quantity: 1

FEATURES

110 Modular Jack Assembly, RJ145,Universal,Category 5, Modular Plugs and Jacks, Cable Mounted Jacks, Brand: AMP, Product Type: Jack, Jack Type: 110Connect, No. of Positions 8, Wiring Pattern: Universal, Termination Style: 110 style punch-down, NETCONNECT Select System: Yes, Keyed: No, Shielded: No, Performance Category: Enhanced Cat 5, ;Housing Color: Bl;ack, Packaging Method: Poly Bag, Packaging Quantity 1, Housing Material: Polyphenylene Oxide, Housing Flammability Rating: UL 94V-0, Contact Material: Phosphor Bronze, Contact Mating Area Plating: Gold (50) over Nickel, Contact Termination Area Plating: Tin-lead over Nickel, Wire Range (Solid)(mm[AWG]):22-26AWG, Wire Range (Stranded)(mm[AWG]):20-26 AWG, 110 Block Material Polycarbonate, Comment: T568A and T568B wiring patterns combined in one P/N.

| | |
|---|---|
| Type: | Category 5 |
| Conductors: | 8 Wire |
| Color: | Black |
| Manufacturer Name: | AMP |
| Price: | $.01 |
| Product ID: | 1084179 |

FIG. 4b

SYSTEM AND METHOD FOR CREATION AND MAINTENANCE OF A RICH CONTENT OR CONTENT-CENTRIC ELECTRONIC CATALOG

CROSS REFERENCE TO RELATED APPLICATIONS

This application is a non-provisional claiming priority to U.S. provisional application No. 60/425,724, filed on Nov. 13, 2002, the entire contents of which is hereby incorporated by reference as if fully set forth herein.

BACKGROUND OF THE INVENTION

1. Field of the Invention

The present invention relates to an integrated system and method for importation, extraction, cleansing, aggregation, creation, management, transmission, taxonomy assignment, analysis and publishing of content-centric electronic catalogs, e-catalogs, or enterprise data that seamlessly integrate catalog content from potentially multiple sources for searching, analysis, and maintenance by multiple users. More particularly, this invention relates to system and method employing a content-centric framework comprising an open and fully extensible schema for the creation, management and publishing of online e-catalogs of products and services from potentially multiple internal and external sources. Most particularly, the present invention relates to a content framework or schema of pre-defined product and service classifications and workflow rules for the creation and management of catalog content. Such content can be readily customized to incorporate proprietary and legacy data in order to create, manage, publish and syndicate to e-catalogs from potentially many sources for use by potentially many users.

2. Description of the Related Art

One of the most critical components of any purchasing or selling process, or online or e-business strategy is the electronic catalog of products and services utilized for buy and sell side applications, sourcing, and inventory control and ERP systems. If items are not represented properly in an electronic catalog, any system employing the catalog can be rendered useless and frustrate users.

Existing supplier catalogs typically comprise industry and supplier specific technical terms and jargon as well as standard and ad hoc abbreviations, usually in the form of keywords and short item descriptions. Relationships between products and the type of domain they are commonly associated with, most often have been overlooked in prior art product classification schemes and search engines intended to guide users to products they seek. Almost every searcher using such systems has experienced the frustration of repeatedly trying to locate an item in such a catalog and not being able to locate the item because it is been associated with keywords or concepts not familiar to the searcher and no framework was available to guide the searcher.

Furthermore, the ability to manage suppliers, including contract compliance and strategic spend analysis, can be restricted by unusable or inaccurate historical data from multiple data processing applications, bad business processes, and non-compliance with existing policies and procedures. The ability of the data to conform to preferred internal schema, account coding, policies and procedures, is critical to the success of any purchasing or selling program.

These problems with existing catalogs and their search engines, and historical data, cannot be alleviated by standardization alone. Item descriptions, keywords, concepts, and families of goods and services that have been well established by suppliers and industries and should be the basis for guiding searches as well as for storing items for retrieval, must somehow be captured and used as templates for developing a catalog of products and services that helpfully guides users to the items they seek.

Quality of catalog content directly impacts the effectiveness of buy and sell-side processes and related data processing applications, as well as traditional ERP systems. The information stored within a catalog is only useful if it can be found and can be related to internal data processing programs and the enterprise's policies and procedures. If content is of poor quality, end users will tend to not use their systems and resort to maverick (i.e., off-contract) spending (in the case of a procurement application). In such a scenario, any benefit of price discounts, strategic sourcing, vendor contract compliance, vendor performance measurement, and other cost of ownership are lost. Furthermore, the accuracy of an enterprise's financial reporting and financial statements can be impaired by the miss-categorization of fixed assets, consumables, services, or other categories.

In addition to problems associated with enabling an e-catalog with rich content, there is the challenge of actually managing the process to obtain data from disparate supplier sources and creating an online data repository that can be used throughout an enterprise and not just as an e-catalog that supports an e-commerce platform, i.e., the challenge of providing an e-catalog that synergizes with sellers and buyers business practices.

SUMMARY OF THE INVENTION

Thus, there is a need for an end-to-end solution, process, and services which facilitates a rich content data repository of product/supplier data of the highest possible quality, that adapts to and reflects the descriptive nuances of products available from individual suppliers and that relates them to industry standards and to supplier and buyer business practices, in order to provide a satisfactory search in a procurement setting, so that the user finds what is wanted, is able to compare attributes, vendor terms and conditions, prices, availability, options, replacement parts, verify contract terms and conditions and all other details related to the product or vendor, and the goals of the procuring organization are not compromised. The present invention provides the best quality content for e-catalogs, content that is rich in its variety of features while being both descriptive and intuitive from a user perspective, and in addition supports buyer and seller business practices and industry and manufacturers' standards for technical information The present invention provides flexible technology which allows integration with multiple internal and external parties and systems. Such a repository centers on an e-catalog that maintains a high degree of congruence with an organization's business and procurement goals by focusing on meeting every searcher's needs while supporting an organization's business practices.

To meet these needs, the present invention incorporates a Portal which acts as the main "gateway" to a rich content support environment, where owners of catalog data can find all the functions and services required to author their rich content databases in a Web environment. This Portal has the capability of Syndicating rich content to virtually any eCommerce community, see FIG. 1. The present invention provides a comprehensive suite of integrated features, functions and services that enable buying and selling organizations to produce, manage, web-enable, and publish electronic catalogs in a manner that is synergistic with their business practices.

The underlying framework for the present invention is based on an extensive and extensible knowledge base of over 200,00 patterns covering an extremely broad range of 44,000 families of goods and services. This knowledge base can be used to load any database (e.g., Oracle, Sybase, DB2, Access, etc) or any spreadsheet (e.g., Excel), as well as to output XML, EDI, or any other standard format. The present invention integrates with multiple diverse applications, including applications from both buyers and sellers and Application Service Provider, e.g., accounting, marketplace, B2B e-business, Enterprise Resource Planning, and CRMs. The present invention is platform-neutral.

e-CATALOG

In one aspect, the present invention provides a system and method for building a rich content repository centering on an e-catalog of products and their vendors where the product and vendor input data can be provided by one or more product suppliers in as many industries and can be in many different legacy formats. This invention is a system and method for rich content creation and maintenance that uses a knowledge base of patterns for categorizing goods and services into families described by a common language generator or CLG. This invention aggregates the syntax and semantics of at least one product supplier's database, data, and administration processes and transforms them into a normalized form or pattern which is then used to define, populate, and administer an e-catalog database with data imported from at least this one product supplier's legacy database(s). The present invention is a rich content creation and management system and method that provides users with the ability to:

Create a standard rich content database with referencing schema of classification;
Define, import, and apply multiple schema, pricing, and product attributes to products;
Assign User and Group permissions based on role, workflows, and trigger events;
Use industry standard schema such as UN/SPC or predefined schema;
Review reports and analysis of products, system administration, and system functionality;
Define workflows for business processes;
Maintain classification schema and items by addition, modification or deletion;
Import classification schema and rich content data from different sources;
Optimize Content and Product Views based on User Profiles and Shopper Groups;
Manage Access Authorization and Security Levels for application and database; and
Utilize the Inventor as a Service Bureau to provide outsourced content management services The user view of the workflow work process management aspect of the system and method of the present invention is described in Appendix III.

The user view of the data syndication aspect of the system and method of the present invention is described in Appendix IV.

The user view of the import of an external schema aspect of the system and method of the present invention is described in Appendix V.

The user view of the schema management aspect of the system and method of the present invention is described in Appendix VI.

Appendices VIII and IX are press releases describing the system and method of the present invention.

The e-catalog aspect of the system and method of the present invention comprises six key functional areas:

1. Data Aggregation

Data Aggregation activity consists of importing, standardizing and validating incoming content data. It also covers the import of schema files and their inclusion as appendages to specified branches of the existing schema, as well as historical data from accounting and procurement systems that may be processed for strategic spending analysis, vendor contract compliance, scope analysis, and to develop business processes, policies and procedures relating to both the Invention as well as internally for the user's enterprise.

Incoming content may be received in different electronic formats and file types. Incoming electronic files are imported and their file structure is mapped to the standard Rich Content+ Database Structure. This mapping process enables content coming from different sources to be handled in a consistent manner. The incoming items can be compared against existing catalog items for updates and appropriate actions can be taken based on the delta analysis report. The imported content is validated to eliminate errors and then made available for further processing.

Incoming content may be received in non-electronic form and processed using the Inventor as an outsourced Service Bureau. Such non-electronic form may include paper catalogs, data-sheets-, material data safety sheets, etc. The non-electronic forms will be entered into the Invention by the Inventor to create an electronic catalog, and processed accordingly.

2. Common Language Generator (CLG)

The CLG process consists of multiple successive activities: Schema Definition, Item Classification, Pattern Building, Value-extraction and Quality Assurance. The CLG process also covers manual additions and modifications to items, definition of synonyms, definition of accessory information and association of items across different schemas.

A referencing schema of categories is defined for enabling classification of rich content items. These categories comprise classes and sub-classes in a parent-child relationship structure. Items are categorized within respective classes or subclasses based on their features or properties. These features/properties are called Attributes.

Incoming items are processed in stages in the system and method of the present invention. There are seven stages through which an item passes before it is available for publishing or syndication. These stages are:

Ready For Identification: Incoming items are classified using automated or manual processes. The automated process matches incoming item descriptions with existing schema class attributes by using a pattern-recognition feature. The items are imported into matching schema classes and inherit the attributes of the respective parent classes.

Ready For Value Extraction: Classified items are further processed to extract and populate attribute values using pattern-recognition features. Patterns are defined for both class attributes and attribute values and are stored in a pattern database.

Ready For Enrichment: Value extracted items are further enriched by associating accessories, images & documents with it and associating the item with multiple schema classes. These items are then moved to the "Ready For QA" stage.

Ready For QA: Quality Assurance procedures are performed on value-extracted and/or enriched items to identify and correct anomalies. These items are then approved and moved to the next stage.

Ready For Shipping: Items that are approved by Quality Assurance process are flagged as "Ready For Shipping". These are then selected and shipped to the "Staging" data area so that they can be published, syndicated or maintained. The CLG and Maintenance functional areas operate on the same "Staging" data area.

Shipped: Items that are available for publishing, syndication or maintenance are flagged as "Shipped". CLG is not able to process these items. These items can be maintained using the Catalog Maintenance module.

Maintained: Items that have been added, modified or deleted using the Catalog Maintenance module are flagged as "Maintained" items. "Maintained" items that are submitted for approval are not available for processing in CLG or publishing, syndication or maintenance. Once approved, the "Maintained" items can be published, syndicated or maintained. On rejection of the submission of a "Shipped" item, the status of these items changes back to "Shipped". When an item with original status of "Maintained" is modified and its submission rejected, the status of the item remains "Maintained".

Authorized personnel may skip one or more of the CLG processes before quality assurance. Projects from CLG are treated as catalogs while publishing, syndicating or maintaining. The classification schema for the catalogs and the projects is the same. Reports are generated to provide status update details and statistics on activities throughout the CLG process.

3. Catalog Administration and Publishing

Catalog Administration involves definition and maintenance of critical administrative information on individual catalogs. These include User and Group profiling, price markup definition, product view definition, authorizations, formatting, syntax, and other attributes as may be required by users or enterprises.

The catalogs can be "Published" to the Catalog Browser Web Application or any electronic data processing system which can accept such data, or can be "Syndicated" to users and customers, or can be viewed in various electronic and paper reports and analysis.

Using a workflow engine, the publisher allows authorized personnel to approve the changes made on "Shipped" items and re-publish or syndicate the changes to the Catalog Browser WEB application or customers.

4. Catalog Maintenance

Catalog Maintenance involves definition and management of rich content items within a published catalog. Rich content items can be added or existing items can be modified or deleted. Items are moved, copied and associated across different schema locations in a variety of specified different ways. Only "Maintained" items without submissions and "Shipped" items can be maintained in the Catalog Maintenance module.

Items in the "Shipped" stage can be sent back to the "Ready For Identification" or "Ready For Value Extraction" stage of CLG. Items "Ready For Identification", "Ready For Value Extraction", "Ready For QA" and "Ready For Shipping" are not available for publishing, syndication or maintenance till their status is changed to "Shipped". Only authorized personnel can perform this change of status.

The classification schema can be maintained for each catalog/project. All changes to the catalog using the Catalog Maintenance module are submitted for approval to authorized personnel. The changes are approved and then republished for use by Catalog Browser WEB application or syndication.

5. Catalog Browser WEB Application

The catalog browser WEB application enables browsing and navigation of published catalogs. Shoppers use the published catalog to purchase available items or request quotes for non-available items.

6. Data Syndication

Data Syndication involves exporting of rich content to customers in different file formats. The rich content database is wholly or partially exported in the format as specified by the customer requirement.

The system and method of the present invention provides multi-tier pricing and a standard database structured according to a foundation schema.

Business Practices

In another aspect, the present invention can synergize, define, maintain compliance with, or facilitate, with owner, buyer, and seller business processes, policies, procedures and practices by providing functionality and a rich content data repository having the following features:

Data can be used throughout the production, accounting, customer service and marketing functions of a buyer, seller, and owner organization;

Supports industry norms for categorizing, searching, purchase order descriptions, and design description, that is, data and images together provide intuitive transaction support so users see a familiar description and image;

Linked to supporting information such as images, usage tables, Material Safety Data Sheets (MSDS) and attachments;

Linked supporting information supports electronic and printed publishing;

Content is formatted and updated to meet industry and Market Place standards (ROSETTANET, cXML, XML, EDI, etc.);

Content can be published and managed in-house by an owner or via service bureaus;

Content is easily accessible by an owner;

Advanced text-based and/or parametrically searchable;

Data cross-referencing using UNSPSC, UPC and other standards; and

Data can be used for publishing to a variety of media including print and electronic publication.

Thus, the system and method of the present invention can be hosted by the owner or a third party in such a way that businesses participating in the ePlatform of the rich content repository are able to use the rich content repository to support their business functions, e.g., accounting and production functions while sending clear and concise information about their products and services into virtually any channel desired.

The system and method of the present invention also provides a private marketplace which can be tailored to specific buyer needs, allowing contracted items/prices in separated views within the same marketplace, which reduces maverick buying. Appendix I and FIG. 3 describe the multi-tier pricing of the system and method of the present invention.

Appendix VII is a template for a proposal to a business organization for using the system and method of the present invention to create and maintain a rich content database for that business organization. As such, Appendix VII describes a business process for creating and maintaining rich content using the system and method of the present invention.

BRIEF DESCRIPTION OF THE DRAWINGS

FIG. 4a illustrates typical legacy data input.

FIG. 4b illustrates a rich content catalog entry created by the present invention for the legacy data input illustrated in FIG. 4a.

DETAILED DESCRIPTION OF PREFERRED EMBODIMENT

Figure 1:
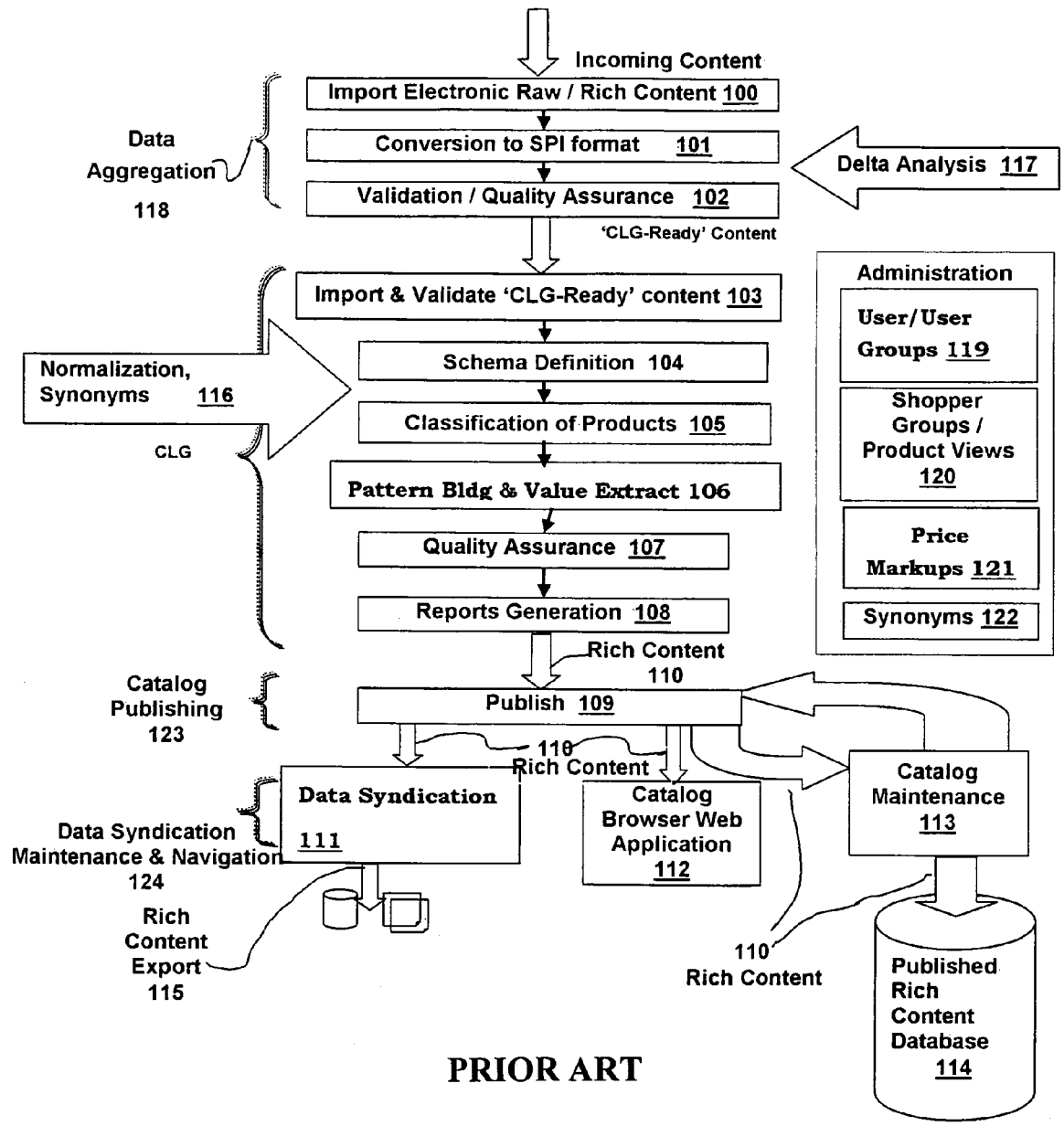
FIG. 1 illustrates the integrated system and business process of the present invention, beginning with importing of raw data through syndication of enriched data to eCommerce catalogs, ERP system and legacy systems.
Figure 2:
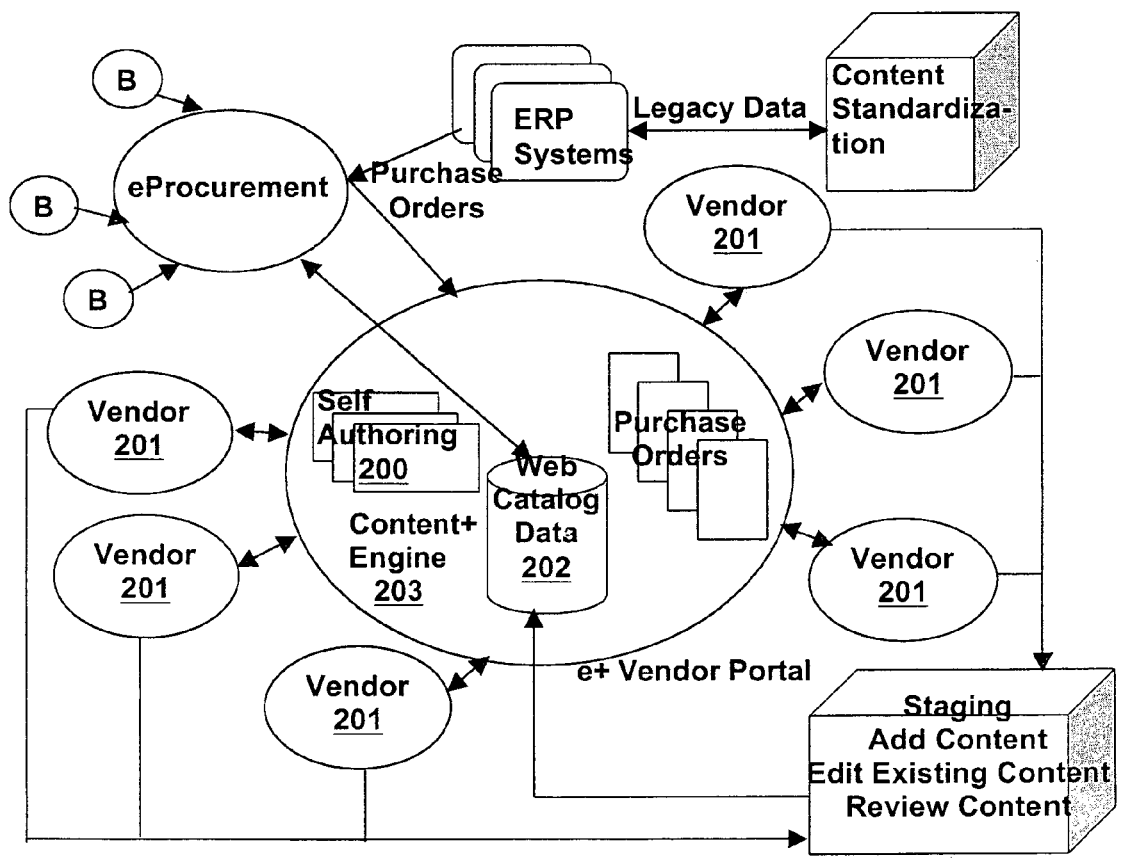
FIG. 2 illustrates the vendor self-authoring system, integration with the CLG processes and system workflow through to syndication to back-office systems of the present invention.
Figure 3:
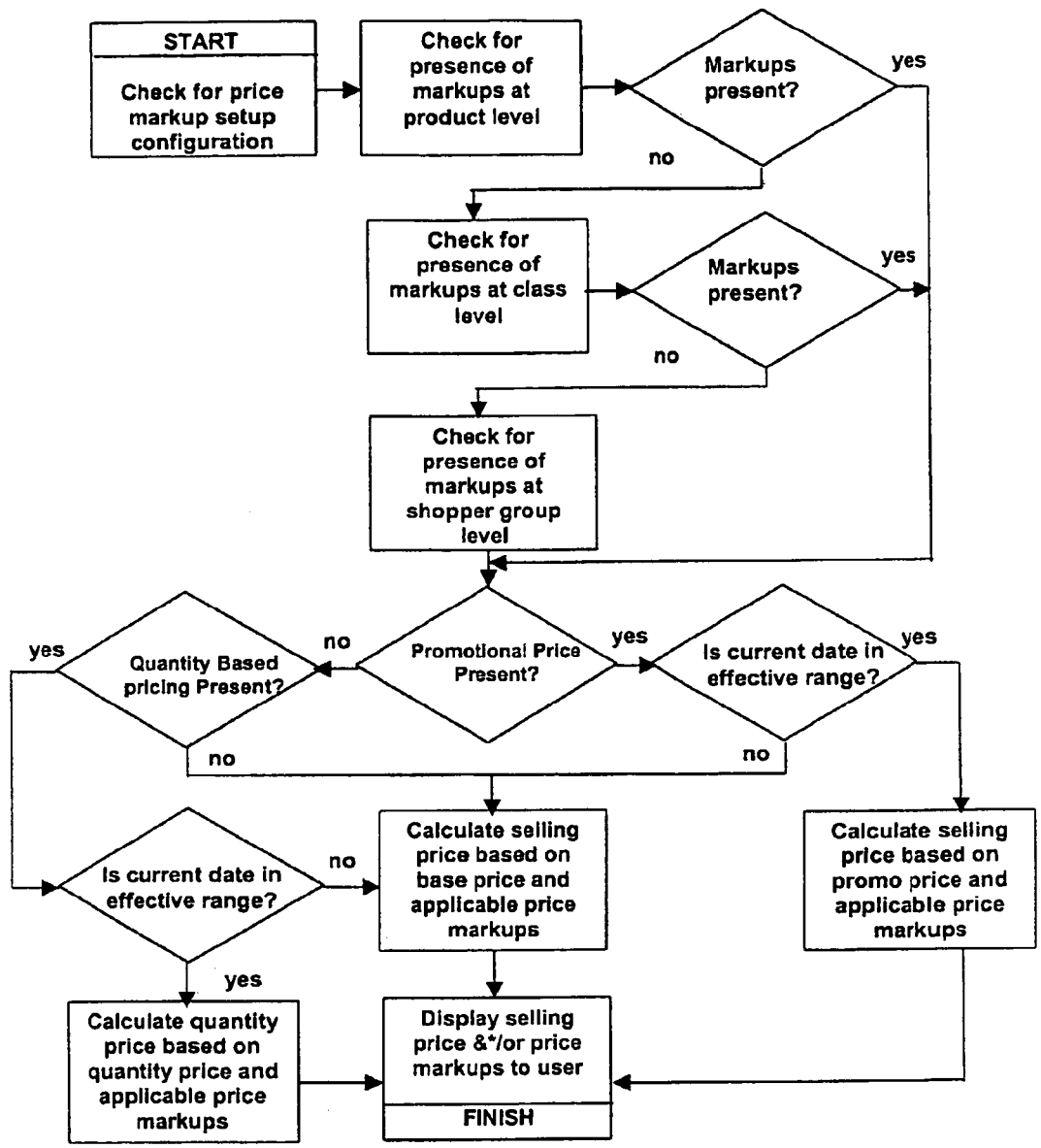
FIG. 3 illustrates the capability of the present invention to determine price markups, promotional pricing and unit of measure to be displayed within an e-catalog.

The present invention is a system and method for rich content creation and management based on the Vendor Portal illustrated in FIG. 2. It is based on a Content Engine 203 and data framework comprising an open and fully extensible schema. The system and method of the present invention provides owners a Supplier Portal to self-author 200 their rich content into a Content Portal or offers them a Content Engine 203 having the required services to participate in a Content Portal. The Content Engine 203 of the present invention provides full integration with customer's (owners, vendors, buyers) existing applications and systems. As shown in FIG. 1, suppliers and owners are supported by a Content Portal with syndication services 111 to other eCommerce communities. Appendices III-V provide user views of workflow, syndication, and schema import aspects of the present invention whose functional capabilities are described in the following sections.

Supplier Portal

In one preferred embodiment, a Supplier Portal comprises all the activities supported by all the functions required to maintain the flow of content between suppliers and the WEB Catalog, on an ongoing basis. The functions of the Supplier Portal support self-authoring by owners and suppliers or provision of authoring services by a third party:

Signing-up new suppliers;

Managing relationships with suppliers to facilitate the flow of information;

Managing day-to-day activities and communications between owners, suppliers and customers relative to rich content;

Establishing a schedule with owners and suppliers to ensure delivery of their updated content on a regular basis, consistent with predefined timelines;

Tracking customer, owner and supplier content inputs to ensure changes to content are reflected in all catalogs (Staging, and Production Catalogs);

Instructing owners and suppliers on self-authoring requirements; and

On-going web-based training.

The preferred business process established for the Supplier Portal of the present invention comprises the steps of:

training Com Mgrs./Plant personnel/buyers on the Supplier Portal Content Management Solution;

making initial contact by Corn Mgrs./Plant Personnel with suppliers;

Supplier loading a catalog into the Supplier Portal;

automatically mapping and transforming the content into predefined category schemas with identification of additional content requirements;

Suppliers making enhancements and resubmits;

Notifying Catalog Administrators of the availability of new content, via email with a link to the Supplier Portal;

Administrators reviewing, analyzing, adjusting the new content in the catalog; and Administrators performing:
1. Approval of the new content in the catalog,
2. Approval of the new content in the Catalog and request further enhancement of the new content, and
3. Deny approval of the new content in the catalog and request either required enhancements of the rejected new content.

eVendor Portal

The eVendor Portal comprises a Content Engine 201 comprising an extensible set of six key functions:

1. Data Aggregation 116

1.1 Import External Schema 100

Figure 5:
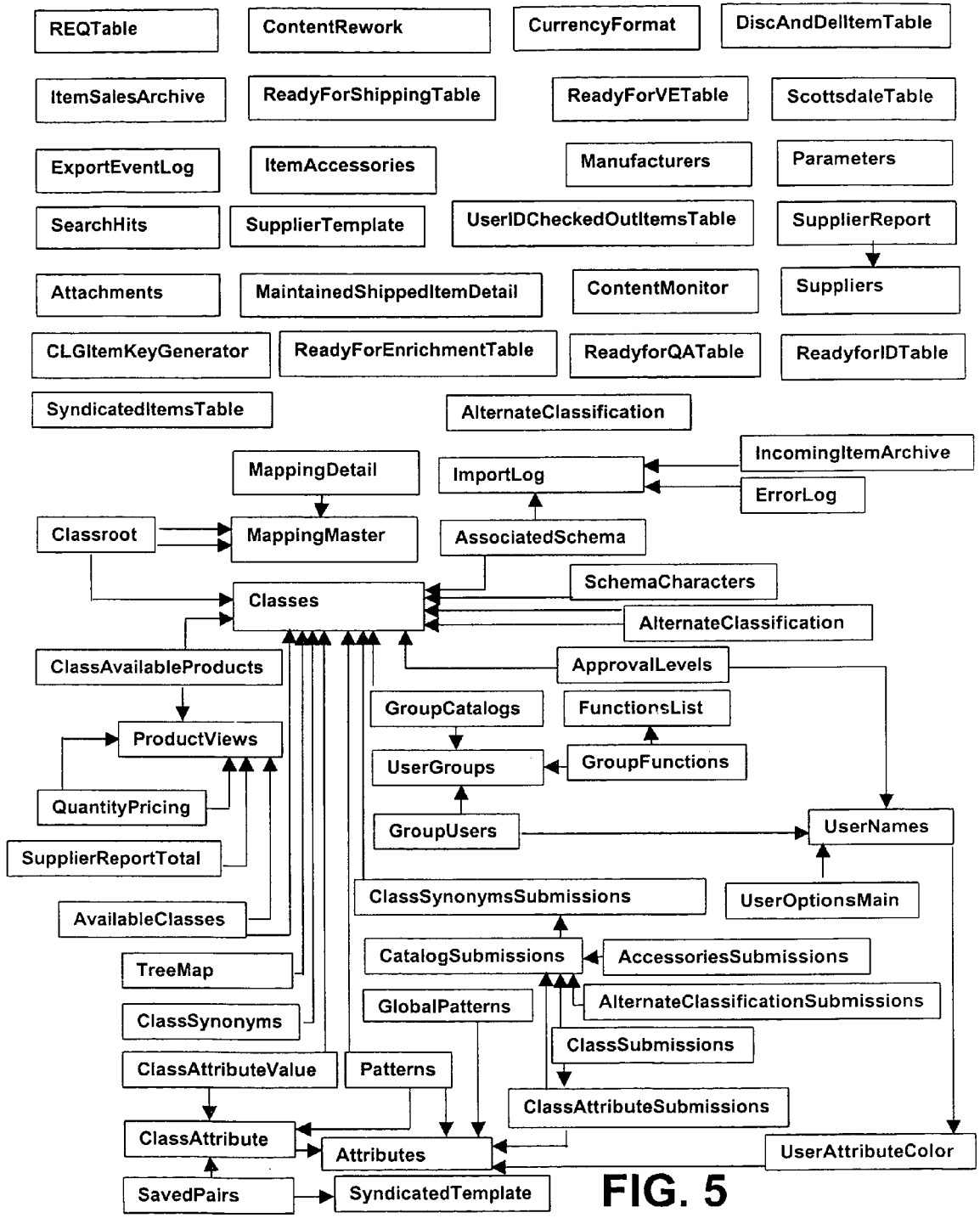
FIG. 5 illustrates the logical database structure for the schema database.

Incoming schema definitions received in electronic format are imported and appended to the existing schema definition. The structure of the schema database is illustrated in FIG. 5.

Select Incoming Schema File: The user specifies the file name, file location and type (MS Access, XML, CSV or MS Excel) of the incoming file. The user also specifies the project for which the incoming schema has to be imported. The contents of the specified file are read and imported as a temporary table into the standard database.

Map Incoming Schema File: The incoming schema is mapped against the standard schema structure. A field-to-field mapping is established between the incoming schema file and the standard schema file. The user can save this mapping as a template for reuse. The referencing values of the schema can be preserved for retaining the association that the incoming schema may have with an item file.

Append Incoming Schema: The mapping process generates a tree-like structure of the incoming schema similar to the standard schema structure. The user compares and appends the incoming classes to a specified class of the existing schema definition.

Synonym Import: The import schema process enables import of class synonyms based on user selection. The user specifies the file containing the synonyms associated with the schema file that is being imported.

1.2 Import Electronic Content

Content is electronically received from suppliers/manufacturers in different file types and formats. The incoming content is read, validated and imported into a standard rich content database structure. The import process is carried out using a set of wizard-like GUI Screens.

Select Incoming Item File: The User specifies the file name, file location and type (MS Access, XML, CSV or MS Excel) of the incoming file. The User also specifies the project for which the incoming data has to be imported. The contents of the specified file are then read and imported into the standard database as a temporary table.

Define Validation Rules: The User defines rules for validating incoming data. Rules can be defined for each field of the incoming item data. The riles are created around a set of standard operators like "mandatory/null" values, "equal to", "greater than", "less than", etc. The User can specify an operator and a corresponding value, if applicable.

Map Incoming Item Files: The incoming item details are mapped within the standard rich content database structure. A field-to-field mapping is established between the incoming content file and the standard rich content database. The User can save this mapping as a template for reuse.

Select Incoming Item File: The user specifies the file name, file location and type (MS Access, XML, CSV or MS Excel) of the incoming file. The user also specifies the project for which the incoming data has to be imported. The contents of the specified file are then read and imported into the standard database as a temporary table.

Define Validation Rules: The user defines rules for validating incoming data. Rules can be defined for each field of the incoming item data. The riles are created around a set of standard operators like "mandatory/null" values, "equal to", "greater than", "less than", etc. The user can specify an operator and a corresponding value, if applicable.

Map Incoming Item Files: The incoming item details are mapped within the standard rich content database structure. A field-to-field mapping is established between the incoming content file and the standard rich content database. The user can save this mapping as a template for reuse.

Extract Specified Characters: The data is cleansed before import by defining characters that should be removed from incoming data. Previously defined characters can be re-used in subsequent import processes. The user specifies the fields from which to extract and remove predefined characters.

Replace Words: The user defines words that are searched for and replaced with user-specified words. This "find and replace" function is applied to all the fields specified by the user.

Validation Report: A list of valid and invalid items in the incoming process is displayed to the user. Details of errors are also provided against each invalid item. The user can selectively import the incoming items to avoid invalid items. The user is presented with a list of items among the incoming items that contain the specified characters. The user can select individual items or multiple items for removal of characters. The characters are removed only from the items specified by the user.

Select Associated Schema: A list of previously loaded incoming schema files is presented to the user. The user selects a schema file from this list. The incoming items are automatically classified according to their association with the classes of the selected schema file. All items that are classified are available for processing in the "Value Extraction" stage. A list items that could not be classified is presented to the user to take appropriate action.

Pre Marked Actions: The system automatically detects the records that are pre-marked for action i.e. the incoming items have the "Supplier Action" field populated. The user is presented with a report of the changes the system commits based on the pre-marked actions. An option to view the report in a printer-friendly format is provided. The user confirms the changes or override them. The following changes are committed based on the value in a "Supplier Action" field:

| Supplier Action | Action Taken |
| --- | --- |
| ADD | A new item is created with the item information from the incoming file. |
| UPDT | The existing item in CLG is updated with item information from the incoming file. The existing and incoming items are compared on Supplier SKU. |
| UPPR | The price field in the existing item in CLG is updated with price information from the incoming file. The existing and incoming items are compared on Supplier SKU. |
| DESC | The supplier long and short description fields in the existing item in CLG are updated with supplier long and short description from the incoming file. The existing and incoming items are compared on Supplier SKU. |
| DEL | The existing item in CLG is deleted. The existing and incoming items are compared on Supplier SKU. |
| DISC | The existing item in CLG is marked as discontinued. The existing and incoming items are compared on Supplier SKU. |

Delta Analysis: All items selected for import can be compared for delta changes with existing items in specified schema locations. The user specifies corresponding fields in the incoming file and the standard content structure to enable the search. The specified fields can be a combination of two fields e.g.: manufacturer part number and manufacturer.

Append Items: For new incoming items, the user specifies the items that need to be imported. All selected items are assigned unique product identifiers. This is available for further processing as the "identification stage". The "Supplier Action" field of the appended items are populated with the value "ADD".

Overwrite Items: For item numbers that are common to both incoming and existing data, the user can view details of differences or changes. The change report shows a field-by-field comparison of the incoming item and existing item. The user selects an option to append the item as a new item or to overwrite existing items. Overwritten items are sent back to "identification stage". The "Supplier Action" field of the appended items is populated with the value "UPD".

Classify Items: All successfully imported items that were not classified during the import process are presented to the user along with the catalog schema tree for classification. The user can automatically classify items within the schema. Auto-classification is performed on the basis of existing patterns associated with specific class attributes using a "voting algorithm". Optionally the user can manually classify incoming items under specified classes of the project using "drag and drop" or "force class" actions. All items are now be available for the next stage.

Import Log: A detailed trace of each import process is kept along with a User/Date/Time stamp.

1.3 Audit Reports—List of Import Processes

A log report is available with different filtering mechanisms to view the import processes by User/Project/File Type etc. An option to view the report in a printer-friendly format is provided.

1.4 Enabling Features and Functions

| Functional Area | Feature | Functions |
| --- | --- | --- |
| Data Aggregation | Import Incoming Schema File | Allow files of different formats (MS Access, Excel, CSV or XML) to be read. GUI for mapping of incoming schema file structure to standard database structure and optionally save the mapping as a template. GUI for manually appending incoming schema branches to any schema branch of existing catalog. |
| | Import Incoming Content File | Allow files of different formats (MS Access, Excel, CSV or XML) to be read. GUI for mapping incoming item file structure to standard database structure and optionally save the mapping as a template. GUI for building custom rules to validate incoming data. GUI for defining special characters that need to be removed from incoming item data while importing. GUI for defining specific words that need to be replaced with specified words while importing. GUI for displaying validation report to the User and allowing him to optionally import items. GUI for displaying a report to the User, showing a list of items with the specified characters to be extracted and allowing him to optionally import items GUI for selecting associated schema file. Processing pre-marked incoming items according to their markings Allow User to view the actions that are to be taken based on the pre-marked actions and allow User to commit or override them. GUI for enabling the User to perform delta between incoming and existing items. Ability to associate items to their original schema. Automatically update the existing items in CLG |
| | elta nalysis eport | Identify/report differences between existing catalog items and incoming item updates during the data upload process. Provide a list of new incoming items and incoming items that are updates to existing items as a comparative report of "before and after update". |
| | User Action Based On Report | Allow the User to append new incoming items to a specified schema branch or to overwrite the existing items with incoming updates. |
| | Audit Reports | Tracking of all the import processes by User/date/time stamp. |

2. Common Language Generator—CLG 125

The Common Language Generator of a preferred embodiment, translates legacy product descriptions into easily understood formats. The CLG uses pattern recognition technologies to identify attributes and produce standardized values that eliminate duplicate and inconsistent information. The data cleansing process of this preferred embodiment combines project management, data analysis, and data rationalization technology to maximize the integrity of data for use in eCommerce systems. The patterns that are added are reusable and make future updates and additions more efficient.

Using the Knowledge Base, CLG translates existing material descriptions, with all their inconsistencies, into one standard description format. Through this automation, CLG improves the productivity and accuracy of standardizing free-form text items. CLG uses pattern recognition to identify attributes and produce standardized format values. CLG is context sensitive for each class of items, and can dynamically adjust its pattern recognition to each material description's content.

The following are two descriptions for Gloves from a supplier's system:

GLV LATEX 12IN SZ 10 12PR/PK 394 10 ANSELL 1139494D

GLOVE NITRILE PF 9½ TNT L 100/PK 92 600 L ANSELL 189992748C

Without a key or some sort of material knowledge, it is extremely difficult for a first time user to understand the meaning of this data. In addition, inconsistencies can be found between the descriptions of the first and second items. In the first item, has the letters "GLV" meaning Glove and in the second item has the word GLOVE even though both items would fit their requirements.

The CLG Knowledge Base contains over 200,000 patterns for a wide variety of product categories. For this item, the patterns are built in a category set for "Chemical Resistant Gloves". When CLG first analyzes the data, it looks for a category match. In this case, it would find "GLV" and "GLOVE" and compare this to the Knowledge Base. If those text strings had been previously built for the Glove category then CLG would analyze the attributes under Gloves and compare them to the description for matches.

In cases where CLG finds a match against more than one category, it utilizes material intelligence to determine the best match. For instance, CLG may examine a line and recognize the word "Washer". It finds three categories that use "washer" as a heading; a fastener component, a clothing washer, and a liquid cleanser. By analyzing the rest of the data surrounding the word, CLG recognizes three attributes that match the category for clothing washer, but only one attribute for the others. It therefore determines that the item is a clothing washer. To date, the CLG Knowledge Base correctly identifies items over 90% of the time.

Once CLG determines a product's category, the patterns for that category are invoked to identify the attributes that identify the item. The following are some of the patterns that have been created for the "GLOVE" category that would fire against the line items shown above:

"SZ"="SIZE"

Any number following "SZ"=Glove Size

The final output would look similar to the following:

|  | LINE 1 | LINE 2 |
| --- | --- | --- |
| GLOVE SIZE: | 10 | 9½ Inch |
| GLOVE MATERIAL: | Latex | Nitrile |
| USAGE: | Chemical Resistant | Chemical Resistant |
| BRAND NAME: | None | Touch N Tuff |
| MANUFACTURER NAME: | Ansell-Edmond Ind. Inc | Ansell-Edmond Ind. Inc |
| MANUFACTURER PART NUMBER: | 394-10 | 92-600L |
| SUPPLIER NAME: | Fisher | Fisher |
| SUPPLIER PART NUMBER: | 11-394-94D | 18-999-2748C |

The result is much easier for an end-user to read and is consistent from one item to the next. Once these patterns are built, they then fire against any record that is defined as a Glove. The process becomes automated and saves the supplier the effort of re-keying the item by hand. Not only are the results easier to read for the end user but they also they the customer to search parametrically or by advanced text. By clicking on a category of Glove, for example, the user is presented with a series of drop down boxes that contain only the valid choices for the attribute. This keeps the customer from making keystroke errors and quickly narrows the search to the product that best fits the customer's need.

To date, the CLG Knowledge Base comprises over 200,000 patterns across 44,000 families of goods and services. This represents over 1.5 million distinct items. Users can easily add new vocabulary and grammar to the Knowledge Base for new valid values, synonyms, misspellings and abbreviations in their own data.

FIG. 4a illustrates a legacy input and FIG. 4b illustrates the catalog output of a preferred embodiment of the present invention.

2.1 Schema Definition 104

For managing content in a collaborative, multi-user, multi-catalog environment, a "project" is defined per catalog. Upon creating a "project", the classification schema for the project can be defined as classes and sub-classes under it. Each class is defined in terms of attributes. A class inherits attributes from its parent. A set of GUI Screens is available to perform schema definition and maintenance functions.

Define Project: To manage a customer's data, the user defines a project. Thus each project represents a customer. All the existing projects are shown as nodes of the same tree. This tree interface is used to add new projects. Thus all first-level children under the root of this tree are "projects". The classification schema of items for the project is defined as sub-classes of the project node. Only classes can be defined under a project. Only classes can be defined under a class.

Define Class & Class Attributes: For a project, the user creates classes that represent the classification schema for items. Each class can have up to 30 attributes inclusive of inherited ones. Attributes can be selected from a global pool of attributes or the user may define them. Every attribute defined by the user is also made available in the global pool thereafter. A list of possible values for an attribute can be defined. These values are available during value extraction, enrichment and QA stage. User can select value from this list or can add, edit or delete values from this list. The addition is submitted for approval before it is reflected in the schema.

Attribute Inheritance: A class automatically inherits the attributes of its parent. A class can have a maximum of 30 attributes, inclusive of its inherited attributes. On copying a class to place it under some other class, only the non-inherited attributes of the class (which is being copied) are copied. The new class thereupon inherits attributes from its new parent. If duplicate attributes for the new class are created as a result of this, the user is notified of this during the copy operation itself, and the duplicate attribute is copied into the new class. The user can take appropriate actions for duplicate attributes, if required.

Edit Class Attributes: The user can modify an attribute of a class. New attributes can be added to an existing class. Existing attribute information can be modified or the attribute can be deleted. On adding an attribute or editing/deleting an existing one of a class, the user is notified of the impact his activities may have on existing items under that class. The change is submitted for approval before it is reflected in the schema.

Copy/Move Classes and Items: Child classes of a class (of any project) can be copied or moved to another class (of any project). Copying or moving a class also copies or moves all the items under that class along with it. The user may also explicitly select items under a class and copy/move only them to some other class. These changes are submitted for approval before they are reflected in the project. Items reflect their new parent class after approval.

Delete Catalog Schema (Classes): Users having appropriate authorizations can delete a class from any project. All the sub-classes under that class are also deleted. Similarly all the items under each class under that class are also deleted. Before any deletion, the user is prompted. Only if the user wishes to proceed, is the deletion carried out. If an item from this set is maintained under multiple classes, associations to all classes other than the deleted class and all its descendant classes are retained. The deletion is submitted for approval before it is reflected in the schema.

Schema Change Approval: Any change to the classification schema is submitted for approval. The submissions are approved/rejected in the common Approval module. These changes are approved by authorized personnel only. The changes are not visible until they are approved. When any change to a schema class is approved the following actions are performed based on approver choice Approval of Addition of a Schema Class: The new class is available in the classification schema.

Approval of Modification of a Schema Class: All child items of the class in CLG can be sent back to the "Ready For Identification" or "Ready For Value Extraction" stage. All "Shipped" items of the class can be sent back to the "Ready For Identification" or "Ready For Value Extraction" stage of CLG or they can be submitted for approval in the Approval module.

Approval of Deletion of a Schema Class: All child items of the class are deleted from project/catalog.

2.2 Build Description and Normalize Incoming Content 116

Unformatted, raw imported content needs to be processed through CLG to classify it, and value extract it. For both these processes, the descriptions of the individual items are scanned to detect patterns. The more prolific the description is in terms of the patterns that fire on it, the higher are the chances of the item getting classified accurately, and getting value extracted maximally. Thus building richer descriptions manually, with an aim to facilitate more efficient CLG processing is enabled through a set of GUI screens. Enriched content can bypass CLG and be made available directly for QA.

Select Project: To enhance incoming data, the user first needs to select a project from a list of existing projects. Once a project is selected, a list of all load events is presented to the user. From this list, the user can select one or more load events to build descriptions for the items imported during the load event(s).

Build Descriptions: Imported content may be enhanced to enable better classification and value extraction. The user can build rich descriptions for an item. The user can add attributes to the item along with their values. However, these attributes are not retained. They become a part of the description itself and are meant only to enrich it. They are not meant to exist separately as "attributes" at this point.

Normalization: Normalization features like "spell-check" and "find/replace" can be used to normalize the description. The "spell-check" utility also allows the user to customize the dictionary. Users can add specific acronyms and abbreviations to the custom dictionary, which upon approval are ignored during spell check. The "find and replace" feature can be executed for a selected item or a set of items on specified fields. The case of text in text fields are changed during editing or adding an item. Manufacturer and Supplier names can be spell checked against those already added to the database tables. Only correctly spelled ones are accepted. After normalization, the item can be moved to QA and thus made to bypass CLG processing.

2.3 Build Patterns 106

Incoming items may have unstructured, unformatted and differing descriptions. The attributes or characteristics of items are generally derived from the description. Items having similar characteristics essentially have some common "words" in the description. This forms the basis of pattern building and matching.

Patterns are definitions of parameters that are present across a group of similar items. These patterns may be associated with attributes that have been defined for respective classes or they may be associated with global attributes. Patterns enable auto-classification of incoming items and extraction of attribute values from description fields of items. A set of GUI screens are provided to build patterns for attributes.

Define Global Patterns: For a global attribute, a pattern can be defined. This pattern then is designated as a global pattern, although it is only associated to that particular global attribute. Users can submit a pattern created for an attribute or a class to be designated as global. These submissions, seeking to promote a pattern, as a "global" pattern must be approved. On approval, patterns get associated to the global attribute. Global patterns are used while processing items under classes having the respective the corresponding global attribute. The user selects the global attribute and defines incoming and outgoing strings for defining the global pattern. The user can select a word, right click and filter containing or not containing the selected word.

Build Patterns: A pattern is defined to be the definition of a parameter. Patterns are used to identify items as well as to extract values for the attributes assigned to them. The voting algorithm employed selects assigns that class to the item for which maximum pattern matching was realized, and hence the most number of attributes are extracted from the unformatted description.

Apply Pattern to Attribute: Patterns are associated to an attribute. Thus for an attribute, the user can define more than one patterns. The patterns of all the attributes of a class are collectively compared against the description of an item.

Save Pattern as Class Synonym: A pattern can be saved as class synonym during classification and value extraction stage.

2.4 Data Classification

Incoming items have to be classified under appropriate classes of the intended project. The classification can be done manually or the user can choose the automatic mode, wherein through pattern matching, the items get classified to their "most likely" respective classes.

Select Project: A project is selected to classify the items under it. These items may or may not have been classified previously.

Select Items: All unclassified items imported under this project are presented to the user. The items are presented to user as group of classes. Filtering to locate a specific set of items, based on import event, is provided. The user can select items from single or multiple import events. Multiple filters are provided to filter similar products. The user can select a word, right click and filter containing or not containing the selected word. Items can be sorted by single or multiple columns. The user has to checkout items from this list to classify them. Users can checkout a specific percentage of items in a project. Checking-out items ensures that user do not step on each other's work. On checking-out items, the user is shown the list of items he has checked-out and the classification schema of the project in a tree interface. The user can view checked out items in a table grid or an HTML grid. Users can define fields they wish to view or work with in an HTML grid. During classification, the user can add, delete, rename and move classes. Three methods are available for classification: Drag and Drop, Force Class and Interpret.

Build Patterns for Classification: To enhance classification, the user can build patterns before classifying an item. He can associate the patterns with the attribute(s) of the class (es) which the user thinks best approximates the class for the item. A drag and drop feature is provided to associate a pattern with an attribute or a class. Any pattern created by the user can be nominated to become a global pattern. Regardless of whether it is approved to be as such, it is associated with the class attribute and used in the voting algorithm for that class. Regardless of whether it is approved to be as such, it is associated with the class attribute and used in the voting algorithm for that class.

Classify Items—Drag and Drop: The User can select a set of items from the ones the User has checked-out. Then the User selects a class from the tree interface of the chosen project. On dragging the class and dropping it on the table showing all the items, selected and non-selected, the selected items are assigned to the class being dropped on.

Classify Item—Force Class: The other method of manual classification is for the User to choose a set of items from the ones the User has checked-out. The User then chooses a class from the tree. On selecting the "Force Class" button, the chosen items are assigned the chosen class. This method has the same effect as the Drag and Drop method, except that with this method attributes are mined and values extracted for the items based on their descriptions and the patterns of the class.

Classify Item—Interpret: This method allows auto-classification of unclassified items. The User chooses an item or a set of items from the ones the User has checked-out and selects the "Interpret" button. The voting algorithm classifies each item based on the item's description. Existing patterns and those created at this point can help make this classification more efficient.

Configure Options: The User can specify an option to be used during identification. The options that can be configured comprise— a. Output Column Pairs
b. Input Delimiter
c. Output Delimiter
d. Processing Method
e. Reinterpret Classify Items Result: The results of classification are displayed to the User. The User can validate the result of classification and can approve or reject the changes.

On approval, the classified items move to next stage. On rejection, the classification results revert and items are available for classification.

2.5 Value Extraction 106

Classified items are available for value-extraction. Through value-extraction, which is strictly an automated process, the values of attributes of the item get overwritten with new values based on the description of the item and the patterns of the attributes of the class lineage of the item. Before an item is value extracted for the first time, its attributes have default values. If value extraction is repeated on an item, the attributes may get different values than the previous value extraction process, if new patterns have been defined for the attributes of the class lineage of the item or the description of the item has been changed, during the intervening period.

Select Project: A project is selected to value extract the classified items under it.

Select Items: The User can select items ready for value extraction. The items are presented in tabular form grouped by class. The User can select items from single or multiple import events. Multiple filters are provided to filter similar products. The User can select a word, right click and filter containing or not containing the selected word. Items can be sorted by single or multiple columns. The User has to checkout items from this list for value extraction. Users can checkout specific percentage of items in a project. Checking-out items ensures that Users do not step on each other's work. The User can view checked out items in table grid or HTML grid. Users can define fields they wish to view or work with in HTML grid. During value extraction, User can add, delete, rename and move classes.

Configure Options: The User can specify option to be used while value extraction. The options that can be configured comprise— a. Output Column Pairs
b. Input Delimiter
c. Output Delimiter
d. Processing Method
e. Reinterpret Build Patterns & Value Extract: All the fields of an item can be viewed to build patterns. A pattern builder is provided that enables specifying incoming and outgoing strings for the pattern. A pattern can be nominated for promotion as a global pattern. A pattern does become global unless it is approved. However, that pattern is still applied to the class on whose attribute it was defined. Any pattern created needs to be associated with an attribute. The drag and drop feature is provided to associate a pattern with an attribute or a class. On selecting the "Value Extract" button, based on the previously built patterns and the newly created ones, for the class lineage of the item, the values for the attributes are mined from the description and assigned to the item. However patterns need not be necessarily built to do value extraction. Only existing patterns can be used. The results of the value extraction are displayed to the user. Thus all the possible attributes and their values are displayed.

Send Item Back: A user may send back an item for re-classification if the value extraction results are not satisfactory. Sending back an item for classification means that on re-classification of the item, a different set of patterns is applied to do value extraction, in the hope of obtaining better attributes and values for the items.

Normalize Value Extracted Data: Upon value extraction, items of a class having the same attribute may or may not have the same values for the same attribute, though the values may semantically convey the same meaning. A user can normalize the values of these attributes by the use of the Electronic Format form wherein the distinct values of an attribute of a class (as extracted from all the items of that class having that attribute) are presented to the user. The user can view all items that have a specific attribute value. The user can decide if these different values need normalization or they need to retain their different values. The user can define patterns to normalize the existing attribute values.

2.6 Synonym Management 116

Synonyms are alternate words that are used for identifying a class or an item in a full text search. During a full text search the user inputs a string or pattern that is evaluated against these synonyms. The classes and items whose synonyms match the search string/pattern are included in the search result.

Define Synonyms: Synonyms can be defined at the class level. To define a synonym, a class from a project is selected. A set of synonyms is defined for the selected class. The definition of synonyms at the class level results in the class being highlighted during a search based on the synonym words. Thus, the synonym in effect stands for the name of the class and identifies it. Each sub-class of this class and items under it also inherit this synonym.

Search Using Synonyms: The user can input a string or a pattern when searching for a class. This string or pattern is matched against the synonyms of all the classes and wherever matches occur, those classes are included in the search result.

2.7 Item Management

Item Management involves deletion/modification of items that are marked as "Ready For Enrichment" and editing details of existing items. The Item Maintenance is allowed to operate only on items whose status is "Ready For Enrichment". Associations between identical items under different classes can also be defined during the maintenance process. The user manually changes the status of these items to "Ready For QA".

Edit Rich Content Item: The user navigates the classification structure. The user selects an appropriate class. The list of existing items under the selected class is presented to the user. The user selects the item to be modified. The user populates/modifies item details. The user uploads/changes the image for the item. Thumbnails for the image are generated automatically. The user can also attach or remove PDF files, documents, text files or images to/from the item. Attachments can be shared among items. A maximum of five attachments is permissible. This modified item remains marked as "Ready For Enrichment".

Delete Rich Content Item: Users having appropriate access authorizations can delete items. If the item is also associated with some other class(es), then it is still accessed from those classes. Only when it is no longer associated with any class, is it deleted.

Define Item Association: The user is allowed to associate an item with multiple schema classes. An item under a class of a project may be associated with any class of any project. An item associated with multiple classes is accessible from all associated classes. The reference of all associating classes is stored against the item.

Define Currency Formats: The user "defines currency formats" for each currency. The user specifies the currency code, name, symbol, prefix, suffix, thousand separators, decimal separator and decimal precision to be used to format amounts of the stated currency. The user modifies or deletes existing currency formats based on specific requirements.

2.8 Define and Maintain Accessories

In order to provide a shopper a comprehensive purchasing opportunity, accessories for an item can be defined with the aim of displaying an item together with its accessories r to the shopper in the Catalog Browser. For an item of a project, the user can identify items that serve as accessories for the item. This accessory relationship can be qualified further. The user can also edit the list of accessories defined for an item—some accessories may be dropped from the list, or new ones may be added.

Select Class: The user selects a class from a project. On selecting a class, all the items with status "Ready For Enrichment" under it are displayed and made accessible for defining accessories.

Select Item: The user selects an item for which accessories are to be defined.

Define Accessories: The classification schema of the project is presented to the user, upon selecting an item. Clicking on any class of this tree causes the display of all the "Ready For Enrichment", "Ready For QA" and "Ready For Shipping" items under it. The user can select specific items from this tree as accessories to the selected item. The user can also define the specific type of association (Component, Cross-Selling, Accessory, Replacement Part) and the quantity of the accessory item.

Edit Accessories: Similarly, the user can select an item from the tree view and modify its accessory list or delete accessory associations.

2.9 Quality Assurance of Rich Content 107

The classified, value-extracted and enriched items are then available for quality assurance purposes. At this stage, items are displayed, as they would appear when published.

Select Project: The user selects the specific project to be QA-ed.

Select Items for QA: On selecting any class, the class attributes and their corresponding values are displayed to the user. The user selects a specific attribute value. The number of items matching the attribute value are displayed. The user can filter the displayed items based on defined criteria. The user can navigate to the details of any item from the list of matched items.

Search Catalog: Alternatively, the user can search the catalog for specific keywords and navigate to the list of successfully searched items.

Validate Item: The user then selects individual items and views them. Individual items or a set of items can be approved, edited or sent back to earlier stages.

Approve Item: On approval, the items are eligible for publishing and are flagged as "Ready For Shipping".

Audit Reporting: All content-related activities, including rework are tracked and are presented to the user as reports.

2.10 CLG Audit Reports 108

The user can keep a track of items present in CLG and their current status in terms of processing. Thus the user can know how many items are pending classification and value extraction. The details about these items such as their import event ids (if they were imported), the users who imported/created them etc can be accessed by the user.

List of Items Stage-Wise: The user can know how many items remain unclassified, how many are pending value extraction. This allows the user to take actions on unprocessed items. Filters are provided to specify a set of items based on project or import load event or creator user etc. An option to view the report in a printer-friendly format is provided.

Rework Items: The user can also view those items that have been sent back for rework. These include those items sent back for classification or for value extraction. Filters are provided to specify items. An option to view the report in a printer-friendly format is provided.

Discontinued Items: The user can view the items that have been marked as "Discontinued" based on the expiry date and supplier action fields. The user can view details of each "Discontinued" items. The user can apply Filters to filter the view. The user takes appropriate action based on the report. An option to view the report in a printer-friendly format is provided.

2.11 Enabling Features and Functions

| Functional Area | Feature | Functions |
|---|---|---|
| CLG | Data Processing In Stages | Allow incoming items to be processed in stages. There are seven stages in which the item can be processed - "Ready For Identification", "Ready For Value Extraction", "Ready For Enrichment", "Ready For Quality Assurance", "Ready For Shipping", "Shipped" and "Maintained". Alternatively, content can be allowed to bypass the first three stages namely "Identification", "Value Extraction" and "Enrichment". |
| | Content Rework Capability | Allow the User to revert back a specified set of items any previous stage. |
| | Define and Maintain Schema Classes | Enable the User to add and maintain schema classes as a set of parent-child relationships, visually represented in a tree-like structure. Move/Copy classes from one schema branch to another. In move/copy enable only the non-inherited attributes of a class to be copied. |
| | Define and Maintain Class Attributes | Enable the User to add and maintain attributes for each specified schema class as a set of attribute names. Enable inheritance of attributes of parent classes. Enable definition of list of values for a class attribute. |
| | Define Global Patterns | Allow the authorized User to add and maintain global patterns for attributes. |
| | Manual Data Mining | Allow the User to edit an imported item. Allow the User to attach an image to the item. Provide Normalization functions such as spell check, find and replace, manufacturer and supplier normalizations. |
| | Data Classification | Allow User to select single/multiple items for data classification. Allow the User to view the selected items in a table grid or HTML Grid format. Display the referencing schema in a tree-like structure Allow the User to make changes to the classes. Allow the User to force selected items to be associated with a specified class. Allow the User to drag and drop selected class to set of selected items to associate the items with the class. Allow the User to create patterns for auto-recognition (using a voting algorithm) of the appropriate class relevant to a selected set of items. |
| | Value Extraction | Allow the User to select single/multiple items for value extraction. Allow the User to view the selected items in a table grid or HTML Grid format. Allow the User to make changes to the classes. Allow the User to build a set of incoming/outgoing patterns and associate them to a specified class |

-continued

| Functional Area | Feature | Functions |
|---|---|---|
| | | attribute. |
| | | Allow the User to qualify the defined pattern as global that is effective globally after approval, but still be implemented at the specific class level. |
| | | Extract attribute values from a product description using the patterns that have been defined for corresponding attribute names associated with a specified class. |
| | | Allow the User to send back items to the "Identification" stage, if required. |
| | | Allow the User to standardize attribute values using an "electronic format" GUI. |
| | Define and Maintain Synonyms | Allow the User to define a synonym for a class which would also be inherited by all its subclasses and items, |
| | View Items As A Web Catalog | Provide the User with a facility to navigate the referencing schema and view individual items associated with each class. |
| | | Provide the User with the ability to search for a specific set of items by providing keywords. |
| | | Provide the User with the ability to locate a specified set of items using parametric search inputs. |
| | Audit Reports | The following report is available |
| | | List of items in each stage. |
| | | List of items under rework. |
| | | List of items in each stage within a specified schema. |
| | | List of discontinued items. |
| | Spell Check Utility With Custom Dictionary | Allow the User to spell-check product details. |
| | | Allow the User to modify the dictionary and add custom words (create and maintain a customized dictionary). |
| | Change Case On A Field | Allow the User to change case on text fields in the Add and Edit Item functions. |
| | Find/Replace | Allow the User to find a specific word and replace it with another word in the Add and Edit Item functions. |
| | | Provide a GUI screen to run the feature over a range of items. |
| | Validate Supplier/ Manufacturer Names | Allow the User to validate the Supplier and Manufacturer Names in a product. |
| | Edit Items | Ability to edit the item while performing quality assurance procedures. |
| | Item Management | Enables the User to edit/delete/view items from a project. |
| | | Allows the User to define the attributes of an item itself. Allows also uploading image and other attachments if any for the item. |
| | | Enables modification of specific item details from amongst selected items. |
| | | Enables deletion of an item from a project. |
| | | Allow the User to maintain other classifications i.e. to associate one item to more than one class. |
| | | Allow the User to define and maintain currency formats that are used while displaying formatted currency values. |
| | | Allow use to manually select individual or set of items and send them to "Ready For QA" stage. |
| | Define & Maintain Accessories | Allow the User to browse the classification structure and select the required item for maintaining accessories. |
| | | Allow the User to select another item from the catalog and associate it to the main item as an accessory. |
| | | Allow the User to specify the association type and quantity of the accessory. |
| | | Allow the User to maintain the accessory association and information. |

3. Catalog Administration and Publishing 109, 123, 126

3.1 User Profiling

User profiling includes defining/editing/deleting of a user group and individual user. User groups are defined based on the common functions assigned to a set of users. Individual users are always associated to a user group. Users are authorized personnel using the system to create and manage or browse rich content. GUI Screens are provided to maintain and define users and user groups.

Define User Group: A tree-view of available projects/catalogs and the available functions (GUI screens) are presented to the user. A user group is defined by selecting projects/catalogs and system functions to be accessed by Users of the group. For user groups having access to functions in Catalog Maintenance or Navigator (Catalog Browser WEB application), the user selects the product views applicable for the user group. Each user group can be associated with multiple projects/catalogs and one product view per project/catalog. Product views are snapshots of the catalogs. For user groups having access to Navigator, the user can select the markup values applicable to the group while calculating price. The user can also select an "Enable Request For Quote (RFQ) for Non-Available Items" option. This option enables/disables the ability to request a quote for non-available items while shopping.

Edit/Delete User Group: Separate screens are provided to modify and delete User Group information.

User Management: Separate screens allow definition and maintenance of users. The user-id name, password, email address and the user-group are defined for a User. A user can be associated with multiple user groups. The user is able to switch between user groups without performing re-login. An option to view the list of user in a printer-friendly format is provided.

3.2 Product View Definition

Product views are snapshots of catalogs. They are logical views that lookup the same physical catalog in the database.

Product View Definition: A screen is provided for defining product views. The user specifies a project and then select classes and individual items within the selected classes for the product view.

Edit/Delete/View Product View: Separate screens are provided for editing, viewing and deleting product views.

3.3 Price Definition 121

Price Markups, quantity-based pricing and promotional pricing can be defined for an item belonging to a specified product view.

Price Level Markups: Three Levels of Price Markups are provided—Shopper Group Level, Class Level and Item Level.

Price Markups in each Level: Each Markup Level has three Markup values—Main Markup, Freight Markup and Other Markup used for price calculation.

Shopper Group Markup Definition: Shopper Group Markups allows defining Markups for a selected User Group that has the allowed function of using Navigator (Catalog Browser WEB application).

Class Level Markup: To define a Class Level Markup, the user selects the Project and a Product View for the project. Markups for available classes are defined.

Item Level Markup: To define an Item Level Markup, the user selects the Project and Product View for the project. Markups are defined for specified items belonging to available classes within the product view.

Promotional Price Definition: Separate screens are provided to the user to define Promotional Price at item, level. The user selects the items of the selected Product View within the Project. Promotional Prices can be defined for each item within the Product View. The user specifies the validity period for the promotional price.

Quantity Based Pricing Definition: A separate screen is provided to the user to define Quantity Based Pricing for each selected item within the Product View. The user selects an item, enter the effective and expiry date of the discount, enter the quantity range and a corresponding discounted price for the range. The user can define the Quantity Based Pricing without any time limit.

Edit/View Price details: Separate screens are provided to view, modify and view pricing details.

3.4 Manufacturer and Supplier Definition

The user adds/edits/deletes Manufacturer and Supplier. The Supplier and Manufacturer Names are used for validating Supplier and Manufacturer information of an item.

Add Manufacturer: The user can add a new manufacturer. The user uploads a logo for the manufacturer. Existing logos can be updated or deleted.

Add Suppliers: The user can add a new supplier. The supplier information is used while validating the supplier names in item information. A separate screen is provided to define the field names for supplier. The user defines the field names (E.g. "Address", Email ID", "DUNS No", etc) and specifies whether the fields are mandatory. The user populates the field names for each supplier while adding new suppliers.

Display Manufacturers: The user is presented with a list of manufacturers for reviewing purposes. An option to view the list of suppliers in a printer-friendly format is provided.

Display Suppliers: The user is presented with a list of suppliers for reviewing purposes. An option to view the list of suppliers in a printer-friendly format is provided.

3.5 Ship Items

The items that are "Ready for Shipping" are flagged as "Shipped" and made available for publishing, syndication or maintenance. The user selects a project. The user selects items to be flagged as "Shipped". The items are then marked as "Shipped". Items once flagged as "Shipped" are available to CLG.

Select Project: The user selects a project from a list of projects.

Select Items: The user selects items that need to be marked as "Shipped". These items are in the "Ready For Shipping" stage.

Ship Items: The user marks these items as "Shipped". These items are be available in CLG for processing.

3.6 Send Items Back

The Catalog Administrator can send items back to the "Ready For Identification" or "Ready For Value Extraction" status from the "Shipped" status. Items sent back to CLG are available for publishing, syndication or maintenance. The item for which there is a submission awaiting approval cannot be sent back to CLG. Only the Administrator can change the status of "Maintained" items back to "Ready For Identification" or "Ready For Value Extraction" status.

Select Catalog: The user selects a catalog from which items need to be sent back to CLG.

Select Items: The user navigates the classification schema and selects required items that are to be sent back to CLG. The items with the status as "Maintained" are not displayed. When the user is the Administrator, the "Maintained" items are displayed with a flag that they are "Maintained". The selected items are sent back to CLG.

3.7 Approval Levels

Any modifications to the "Shipped" items during Maintenance and to the classification schema are to be reflected in the Catalog Browser WEB Application database. These changes can be reflected in the Production database only after Approval. These changes are approved by different approval levels. There can be a maximum of ten approval levels. The changes approved from one approval level move to the next consecutive approval level. On the Final Approval Level the changes can be syndicated to the Catalog Browser WEB Application or external systems.

Define Approval Levels: The user defines approval levels that are used while approving "Catalog Change Submissions". The user sets the "Respond by Time Limit" for each approval level. The "Respond By Time Limit" is the maximum time difference between the submission notification to approver and the approval by the Approver. The user defines on Approver for each approval level who approves submissions for only one catalog.

Edit/Delete Approval Levels: The user is presented with a list of approval levels and associated approvers and relevant catalogs. The user edits the approval level definition or deletes the approval level.

View Approval Levels: The user is presented with a list of approval levels and associated approvers and relevant catalogs for viewing purpose.

3.8 Catalog Approval

All changes to the "Shipped" Items & Classes are "Submitted" for approval before they are reflected. "Catalog Change Submissions" are approved/rejected by the User (Approver). The submission is then moved to the next level of approval until the Final Approval is done. The "Catalog Administrator" manages the entire catalog approval. The Catalog Administrator is the super user for a specific catalog/project.

Approver Notification: The User (Approver) is notified of "Content Change Submissions" which lists a summary of changes to the catalog. This submission notification is generated after a pre-determined time period that is specified as a parameter for the application. When the time difference between submission notification time and current time exceeds "Respond By Time" limit, the Catalog Administrator of the catalog is notified of the submission notification. The Administrator takes appropriate action based on the notification.

All notifications are sent as an email to the email address of the User (Approver). The email contains a click-able URL to host of the catalog service.

Select Submissions to Approve: The User (Approver) is presented with a list of submissions. The submissions listed belongs to the catalog and approval level for which the approver is authorized. The User (Approver) can filter and sort the submissions displayed. An option to view the submission report in a printer-friendly format is provided. The User (Approver) can view details of the submission. The detail view shows the item/class before and after the change. The User (Approver) selects the "Submissions" to be approved. The User (Approver) edits the submission if required and approves it.

Search Catalog: The User (Approver) can search the catalog for specific keywords. Based on search results, the user select a class and views the existing submissions for approval. The user can then approve/reject the submission.

Submission Approval/Rejection: The User (Approver) approves or rejects the submissions. On approval the submission moves to the next level of approval. The Approver for the catalog at the next approval level is notified. The submission to the approver in the Final Approval Level is effected in the catalog/project. Schema changes that are approved in the Final Approval Level are reflected in the catalog/project. The user who submitted the "Content Change Submission" is notified when the submission has been approved in the Final Approval Level. The User (Approver) can reject the submission at any level. The rejected submissions are sent back and the changes reverted. The originator of the submission is notified via email of the rejection. The User (Approver) adds a comment against the rejection that is appended to the email. When the submission is an item, the status of item is changed back from "Maintained" to "Shipped" on rejection (unless it was "Maintained" originally). On approval of a submission for an item the item retains its status of "Maintained" and is available for publishing, syndication and maintenance.

Submissions Report: The Catalog Administrator can view submissions that have been approved/rejected for a catalog. The Catalog Administrator can filter the submissions displayed. The Catalog Administrator can view details of the submission. The detail view shows the item/class before and after the change. An option to view the report in a printer-friendly format is provided.

3.9 Publish Catalog 109, 123

Rich content can be published to the Catalog Browser WEB Application. The Catalog Browser WEB Application enables catalog browsing and navigation. Users can use the Catalog Browser WEB Application to shop for catalog items.

Select Catalog to Publish: The user selects the catalog to be exported.

Published Catalog: On publishing, all the relevant information—classes applicable to the project/catalog, items ready to be published, user (shopper) information and group information is published for the specified catalog. The required indexes for enabling full text search capabilities are created.

3.10 Catalog Management 113

The Published Catalog can be marked for deletion and deleted on proper Approval.

Delete Catalog: The user selects the Catalog/Project to be deleted. This selected Catalog is marked for deletion. After Approval, the relevant actions are taken for the selected Catalog/Project.

3.11 Configuration

The IP address of the mail server and the email address to which the RFQ information should be sent. The time period after which a check for submissions and email approvers can also be configured. These are configurable and can be maintained using a set of user interfaces.

Maintain Mail IP Address: The IP address of the mail server is used to send emails. This IP address is manually specified by the User (Administrator).

Maintain RFQ Email Address: The RFQ information is posted an email address. This email address can be defined and maintained by the User (Administrator).

Maintain Submission Check Time Period: The time period after which the submissions are checked and emails sent to Approvers are defined by the User (Administrator).

3.12 Enabling Features and Functions

| Function | Feature | Functions |
|---|---|---|
| Catalog Administration and Publishing | Define and Maintain User Groups | Allow the User to define and maintain User group information. |
| | | Allow selection of schema branches for group access authorization. |
| | | Allow setting RFQ option & price markup configuration. |
| | | Allow selection of available functions (screens) for group access authorization. |
| | Define and Maintain Users | Define, modify and delete User information. |
| | | Ability to attach the User to multiple User groups. |
| | | Ability to switch between authorized User group without re-login. |
| | Define and Maintain Product Views | Display existing catalog schema in a tree-like structure. |
| | | Allow User to select schema and schema classes for product view. |
| | | Allow User to de-select individual items from selected classes for the product view. |
| | Define and Maintain Price Markups | Allow the User to define, modify and delete shopper group level price markups. |
| | | Allow the User to define, modify and delete class level price markups. |
| | | Allow the User to define, modify and delete individual item level price markups. |
| | Define and Maintain Quantity Based Pricing | Allow the User to define price breakups against quantity ranges for a specified item. |
| | | Allow the User to modify and delete quantity based discount information. |
| | | Allow the User to specify Effective date and Expiry date for the quantity-based discount. |
| | | Allow the User to define price breakups without any time limit. |
| | Define and Maintain Promotional Pricing | Allow the User to define the promotional price as an alternative to the basic selling prices for a specified item. |
| | | Allow the User to specify the validity period for the promotional price defined for an item. |
| | | Allow the User to modify and delete promotional pricing information. |
| | Create & Maintain Supplier/ Manufacturer Names | Allow adding, editing or deleting supplier and manufacturer names. |
| | Ship Items | Ability to select a project and required "Ready For Shipping" items. |
| | | Ability to change the status of selected items to "Shipped". |
| | Define and Maintain Approval Levels & Catalog Approvals | Allow to define/edit/view Approval Levels. |
| | | Allow submitting the items for Approval. |
| | | Notify the Approver via email about the catalog changes at approval level for which the approver is authorized. |
| | | Allow the Approver and Administrator to filter the displayed submissions. |
| | | Allow the Approver to Approve/reject the Catalogs. |
| | | Notify the originator of the submission of rejection via email. |
| | | Allow the Approver to attach comments to the email that is sent for rejections. |
| | | Ability to automatically change the status of the item submitted for approval as "Shipped" from "Maintained". |
| | | Allow searching the Catalogs according to the synonyms defined. |
| | | Allow the Catalog Administrator to view the |
| | Publish To Catalog | Provide GUI for initiation of stored procedures to publish catalogs in predefined output format. |

-continued

| Function | Feature | Functions |
|---|---|---|
| | Browser | Execute a set of stored procedures to migrate and update catalog data according to requirements of the Catalog Browser WEB Application. Create necessary indexes for enabling full text search |
| | Send Items | Ability to select a catalog and required item. |
| | Back | Ability to send the selected items to the "Ready For Identification" or the "Ready For Value Extraction" |
| | Configuration | Ability to define and maintain the IP address of the mail server to be used for sending emails. Ability to define and maintain the email address to |

4. Catalog Maintenance 113

4.1 Schema Maintenance

The Schema Maintenance module provides a set of GUI screens for performing schema definition and maintenance functions.

Select Catalog: The user selects the specific catalog to which classes have to be added or existing classes modified or deleted. The classification schema for the catalog is presented to the user.

Add Class and Attributes: The user creates classes that represent the classification schema for items. The user "defines attributes" for each class. The class attributes can be selected from an available-list of attributes. Alternatively, the user can add a new attribute for the class. The new attribute then gets added to the list of available attributes for use in subsequent attribute definition. A list of values for a class attribute can be defined. The addition is submitted for approval before it is reflected in the schema.

Attribute Inheritance: A class automatically inherits the attributes of its parent. A maximum of 30 attributes (including inherited attributes) can be defined for a class. When a class is copied or moved under some other class, only the non-inherited attributes of the class are copied. The new class thereupon inherits attributes from its new parent. If duplicate attributes for the new class are created as a result of this, the user is notified of this during the copy operation itself, and the duplicate attribute is copied in the new class. The user can take appropriate actions for duplicate attributes, if required.

Edit Class Attributes: The user modifies the class attribute of the required class. New class attributes can be added to the existing class. Existing class attribute information can be modified or the attribute can be deleted. The change is submitted for approval before it is reflected in the schema.

Copy/Move Classes and Items: The user can copy or move classes across schema branches and for easy replication of schema parts. Copying or moving a class also copies or moves all the items under that class along with it. The user may also explicitly select items under a class and copy/move only the selected items to some other class. These changes are submitted for approval before they are reflected in the project. Items reflect their new parent class after approval.

Delete Catalog Schema (Classes): Users having appropriate access authorizations can delete specified schema branches. In this case, all the sub-classes and items under the deleted schema branch is deleted. The deletion is submitted for approval before it is reflected in the schema.

Schema Change Approval: Any change to the classification schema is submitted for approval. The submissions are approved/rejected in the common Approval module. These changes are approved by authorized personnel only. The changes are not visible until they are approved. On approval the modification to the classification schema is available throughout the catalog/project. When any change to a schema class is approved the following actions are performed based on approver choice a. Approval of Addition of a Schema Class: The new class is available in the classification schema.
 b. Approval of Modification of a Schema Class: All child items of the class in the CLG can be sent back to the "Ready For Identification" or "Ready For Value Extraction" stage. All child items of the class in "Shipper" status can be sent back to the "Ready For Identification" or "Ready For Value Extraction" stage or they are submitted for approval in the Approval module.
 c. Approval of Deletion of a Schema Class. All child items of the class deleted from the catalog/project.

4.2 Item Maintenance

Item Maintenance involves addition/deletion of items that are marked as "Shipped" and editing details of existing catalog items. The Item Maintenance is allowed to operate only on items whose status is "Shipped". Associations between identical items under different classes can also be defined during the maintenance process. Any change to the catalog items is a "submission" for approval. After approval the change can be effected in the production area. A set of Catalog Browser-like GUI's enables this functionality. Appropriate pricing information of the item is also presented in the detailed item view. The User is associated with one or more product views of the catalog/project. The User performs actions on the catalog/project through the product views. The User is able to switch between product views without logging in again.

Add Rich Content Item: The user navigates the classification structure of the product view. The user selects an appropriate class and adds the item directly under this class. The user populates item details. The user uploads an image for the item. Thumbnails for the image are generated automatically. The user can also attach PDF files, documents, text files or images to the item. A maximum of five attachments are permissible. This new item is marked as a "Maintained" item and is submitted for approval before it is reflected in the catalog. The user is able to add item-specific attributes while adding the item. This is allowed if the class attributes have not reached the maximum allowable limit of 30 attributes.

Edit Rich Content Item: Existing catalog items can be selected from the product view in a similar manner and modified or normalized by the user using the same functions. This modified item is marked as a "Maintained" item and submitted for approval before the change is reflected in the catalog.

Delete Rich Content Item: Users having appropriate access authorizations can delete items. In this case, the deleted item is marked for deletion, flagged as "Maintained" and sent for approval.

Define Item Association: The user is allowed to associate a catalog item to multiple schema classes. An item under a class of a catalog may be associated to any class of any catalog. An item associated with multiple classes is accessible from all associated classes. The reference of all associating classes is stored against the item. The item is marked as "Maintained" and submitted for approval before it is reflected in the catalog.

Define Currency Formats: The user "defines currency formats" for each currency. The user specifies the currency code, name, symbol, prefix, suffix, thousand separators, decimal separator and decimal precision to be used to format amounts of the stated currency. The user modifies or deletes existing currency formats based on specific requirements.

Search Items: The user can alternatively search the product view for specific keywords or using parametric search. Based on search results, the user selects a class and have a view of the existing items under that class. The user can then add the item under the selected class.

4.3 Accessories Maintenance

This feature involves the addition, modification and deletion of items as accessories to another item.

Select Class: The class hierarchy is presented to the user with Catalog Browser like navigational capabilities. The user selects a class.

Select Item: The user accessories are to be added.

Add Accessories: The class hierarchy is presented to the user again. The user selects a class and the corresponding item list is displayed. The user can select specific items from the available list as accessories to the selected item. The user defines the specific type of association (Component, Cross-Selling, Accessory, Replacement Part) and the quantity of the accessory item.

Edit Accessories: Similarly, the user can select an item and modify its accessory list or delete items from the accessory list.

4.4 Synonym Maintenance 116, 122

Synonyms are alternate words that are used for identifying a class or an item in a full text search. During a full text search the user inputs a string or pattern that is evaluated against these synonyms. The classes and items whose synonyms match the search string/pattern are included in the search result.

Edit/Delete Synonyms: The user selects the class to edit/delete synonyms. The synonyms for that class are presented to the user as a list. The user edits or deletes the synonyms as required. When class level synonyms are edited or deleted the effect is cascaded to all children items.

Search Using Synonyms: The user can input a string or a pattern when searching for items or for a class. This string or pattern is matched against the synonyms of all the classes and items, and wherever matches occur, those items and classes is included in the search result.

4.5 Normalize Content 116

While adding or editing an item, the item data may contain raw, non-descriptive and incomplete information. In such cases, the user needs to normalize the item data using "find/replace" and "spell-check" features.

Find & Replace: The user specifies words to be found and replaced in the data fields using "find/replace" features.

Spell Check: The data can be validated and normalized using "spell-check" features. A custom dictionary can be maintained based on projects. The user uses this custom dictionary for performing spell check on the product details. The user changes case on text field.

Validate Supplier & Manufacturer Names: The Supplier and Manufacturer Names in a product can be validated using spell-check features, against a set of standard names that are maintained in separate database tables.

4.6 Enabling Features and Functions

| Function | Feature | Functions |
|---|---|---|
| Catalog Maintenance | Define and Maintain Schema Classes | Enable the User to add and maintain schema classes as a set of parent-child relationships. |
| | | Move/Copy classes from one schema branch to another. |
| | | In move/copy enable only the non-inherited attributes of a class to be copied. |
| | | Enable the User to add and maintain attributes for each specified schema class as a set of attribute names. |
| | | Enable inheritance of attributes of parent classes. |
| | | Enable definition of default attribute values for each attribute name. |
| | Define and Maintain Rich Content Items | Allow the User to create and maintain rich content items. |
| | | Copy/Move items across multiple schema branches |
| | | Allow the User to attach the main image to the product |
| | | Allow the User to attach a PDF file, a document, a text file or an image file to an item. |
| | | Automatically generate a thumbnail image for the main image. |
| | | Allow the User to attach a logo to a manufacturer. |
| | | Display manufacturer logo in the product view. |
| | | Provide the User with a facility to navigate the |

-continued

| Function | Feature | Functions |
|---|---|---|
| | | referencing schema and view individual items associated with each class. |
| | | Provide the User with the ability to search for a specific set of items by providing synonyms. |
| | Define and Maintain Synonyms | Allow the User to define specific words as synonyms. |
| | | Allow the User to define a synonym for a class that would also be inherited by all its subclasses and items. |
| | Add Synonym To Text Search | Include synonyms for the item and class to enable full text search capability. |
| | Define & Maintain Currency Formats | Allow the User to define and maintain currency formats that is used while displaying formatted currency values. |
| | Define & Maintain Accessories | Allow the User to browse the classification structure and select the required item for maintaining accessories. |
| | | Allow the User to select another item from the catalog and associate it to the main item as an accessory. |
| | | Allow the User to specify the association type and quantity of the accessory. |
| | | Allow the User to maintain the accessory association and information. |
| | Spell Check Utility With Custom Dictionary | Allow the User to spell-check product details. |
| | | Allow the User to modify the dictionary and add custom words (create and maintain a customized dictionary). |
| | Change Case On A Field | Allow the User to change case on text fields in the Add and Edit Item functions. |
| | Find/Replace | Allow the User to find a specific word and replace it with another word in the Add and Edit Item functions. |
| | | Ability to run the feature over a range of items. |
| | Validate Supplier/ Manufacturer Names | Allow the User to validate the Supplier and Manufacturer Names in a product. |

5. Catalog Browser Web Application 112

5.1 Catalog Browser Navigation

The published catalog is available online with GUI based navigational functionality. The functionality of the existing Catalog Browser WEB application is replicated. The Catalog Browser Navigator provides GUI based navigational capabilities. The shopper used the Navigator to navigate to the desired product, search by giving keywords, search based on parameters, compare products, request quote for non-catalog items and add catalog items to the shopping cart. The administrative user of the Navigator is able to view predefined reports. The shopper is able to view catalogs that are available to the specific user group that the shopper belongs to.

Item Detail View: The item detail view presents the shopper with information regarding the item including, item name, image, manufacturer name and logo, description, attributes and price. The item detail view shows links that allows the Shopper to view the linked document in a separate popup window. The item detail page also shows a table of associated accessories in a separate popup window. The table has names of the accessories. A hyperlink is defined for each accessory name. Shopper can click on the link to view accessory details. Shopper can navigate back to the accessories listing from the accessory detail page.

The item detail view displays the price based on price markups and promotional pricing of the item. Quantity based price breakups are presented to shopper in a separate popup window that can be accessed from the item detail view. It displays a list of quantity range and associated prices for the item. Please refer to Appendix I for details of price calculation and price breakups information.

Compare Products: The shopper selects the "Compare Products" link from the parametric search UI to compare the products in the class. The shopper is presented with a list of products. The shopper compares the products graphically. The shopper adds one or more products to the shopping cart directly from the comparison page. Multiple products can be ordered from a list of products. Note: The "Add To Cart" function is available in other web pages like in the existing Catalog Browser WEB application.

List Matching Products: The shopper selects the "List Matching Products" link from the parametric search UI to list all products in the class or products matching the specified criteria. The shopper is presented with a list of products. The shopper adds one or more products to the shopping cart directly from the list page. Multiple products can be ordered from a list of products.

5.2 Search Capabilities

The Catalog Browser Navigator provides search capabilities to assist shopper in quickly finding the products. The shopper is provided with two search capabilities—full text search and parametric search.

Full Text Search: The shopper types in keywords to perform a "full text search" for the desired item. Synonyms defined at class level and item level is used for searching. The classes and items that satisfy search criteria are listed. Classes are listed with a figure stating the number of associated items. The shopper selects the required class or item and performs parametric search or view item details.

Parametric Search: The shopper navigates the classification structure of the catalog. The number of items below the class is mentioned against it. The shopper arrives at a class to which items are associated. The shopper is presented with a UI to "parametrically search" for the item. The "parametric search" GUI lists the attributes of the class and the list of distinct values against each attribute. The shopper refines his search based on the attribute values and arrive at the item detail view of the desired item.

5.3 Conditional Request for Quote

The Shopper enables a "request for quote" for products that are not available in the catalog. The Shopper enters the RFQ information in the form. The RFQ information along with the Shopper information is stored as an XML file and emailed to a pre-determined email address. Only authorized Shopper is able to perform this function.

5.4 Catalog Browser Reporting

The searches conducted and search results are logged for reporting purposes. The administrative user of the Navigator is able to view a "Best Selling Items" report, an "Unavailable Items" report and a "Search Results" report. The Best Selling Items report lists best selling items over a defined time frame. The user changes the time frame to view the best selling items based on other time frames. The Search Results report presents information regarding "successful" and "unsuccessful" searches performed by shoppers in the navigator. An option to view the reports in a printer-friendly format is provided.

5.5 Enabling Features and Functions

| Section | Feature | Functions |
|---|---|---|
| Catalog Browser Navigator | GUI Catalog Navigation | The published content is available for viewing as a web catalog. The existing navigational functionality of Catalog Browser is replicated in the specified development environment. The product view includes the manufacturer's logo if the logo is available. A detailed view of each item is available. The detail view page shows a table of associated accessories. The item detail view shows links to view the linked documents. |
| | Text Search Control | The existing search capabilities of Catalog Browser is replicated in the specified development environment. |
| | Calculate Price | Calculate the marked-up price based on prioritization of markups (item-level, class-level and group level) and defined options for inclusion/exclusion of specific markups for a specific group. Calculate the promotional price using markup information and the promotional price, if available. Calculate the quantity based selling price of the marked-up selling price using the quantity-based breakup information. Display the selling price, promotional price and quantity-based price as applicable. |
| | Track Search | Provide the ability to track information about all the searches (successful or unsuccessful) made on the catalog. |
| | Reports | Generate reports to indicate Best selling items Unavailable items List of successful and unsuccessful items for a specified period range. |
| | Conditional RFQ & RFQ Routing | The request for quote (RFQ) functionality for non-available items is available to a Shopper based on system setting. Ability to email the RFQ information to a pre-determined email address with the RFQ information as an attachment in XML format. |
| | Order Multiple Items From List | The capability to order multiple items from the item list is added. |

6. Data Syndication 111, 124

Data Syndication consists of exporting catalogs to various customers. An entire catalog or a specific product view of the catalog can be exported to a customer. A set of wizard-like GUI screens is provided to facilitate export. The user specifies the user group (shopper) and the catalog for syndication.

6.1 Customized Outgoing Templates Definition

During Data Syndication, the user is presented with a wizard-like GUI to select or define new syndication template, customize outgoing templates for schema and items, to specify catalogs to be exported and to map outgoing templates for schema and items. Syndication templates, including rules, can be copied, modified and saved for a new customer. These syndication templates can be reused.

Select Customized Outgoing Templates: The user selects two files from a folder on the server to serve as the outgoing schema and item file templates. These files are in any of the four formats (XML, MS Excel, CSV, MS Access).

Select Catalog: The user selects the catalog and specific product view to which the selected outgoing templates are assigned.

Map Outgoing Templates: Each template file is read and the fields of the template are presented to the user against the standard content database structure. The user maps each field of the outgoing template with the standard database fields. The process allows the user to map the structure of the incoming file for exporting the content in same format. These maps are saved for later re-use.

6.2 Export Catalog 115

During catalog export, the user is presented with wizard-like GUI to select catalog or product view to export, to select export file type, to select export type—full export or delta export, to replace outgoing words and to enable price calculation. A log of each export process is maintained to enable delta comparison and tracking.

Select Catalog to Export: To export content, the user selects the catalog and a product view for the catalog. Product views allow part of the catalog to be exported. The existing export templates are used. The user specifies the file format (MS Access, Excel, CSV or XML), name and location.

The images and linked documents of the items are exported to folder specified by the user. The images and linked documents are bundled in a compressed "jar" file.

Select Export Type: The user specifies the export type—"Delta" or "Complete". In case of delta exports, selected items for the product view is compared against a previous export of the same product view. The comparison yields a list of unchanged items, new items or modified items. The user can view details of each type.

Replace Words: The selected class structure is presented to the user. The user can specify words to be searched and replaced in the attribute values of a specified class. The user selects the class, select the attribute and define the words to be replaced. The defined words are searched and replaced in the specified attribute value or entire catalog. The defined words are added to list of rules for that class and catalog. These rules are used during next syndication of that catalog. The user is provided with a list of existing replace words for selected class. From this list, user can either select the words to be replaced or can define new replace words. Replace words can be defined as literal or as interpretive by providing the pattern builder to define find and replace words.

Price Calculations: The syndication process enables price calculation based on user selection. The list price of the item is replaced by the calculated price of the item. The price is calculated at the time of syndication as per the price markups and promotional price defined for the item. The quantity based price breakup information for each item is exported as a separate Synonym Export: The syndication process enables export of class synonyms based on user selection. The class synonyms are exported in a separate file.

6.3 Audit Reports—List of Export Processes

The user can use audit reports to view details about each export process. An option to view the report in a printer-friendly format is provided.

6.4 Enabling Features and Functions

| Section | Feature | Functions |
|---|---|---|
| Data Syndication | Export Rich Content | Allow export of rich content in different file formats (MS Access, Excel, CSV or XML). |
| | | Allow export of folder of images and linked documents (of the rich content items) as a jar file. |
| | | Provide a GUI for mapping standard database structure with customer specific data structure. |
| | | Provide with an ability to send complete export or re-export only item updates. |
| | | GUI for defining specific words that need to be replaced with specified words while exporting. Specific words can be literals or interpretive, defined by using pattern builder. |
| | Track Exports | Provide a capability of tracking all the export processes with a User/date/time stamp. |
| | Audit Reports | List of export processes executed |

While various embodiments and examples of the present invention have been described in detail, these are not presented in any limiting sense. It is apparent that further modifications and adaptations of the invention will occur to those skilled in the art. However, it is to be expressly understood that such modifications and adaptations are within the spirit and scope of the present invention.

What is claimed is:

1. A method for creating a rich-content repository under a user direction, comprising the steps of:
   a. providing a common language for defining a schema;
   b. providing a standard database structure defined by a standard schema using the provided common language;
   c. importing a content file having at least one of an incoming raw content file comprising an item file structure having at least one incoming item, and an incoming schema file defining the incoming raw content file;
   d. determining at least one difference between the incoming content file and a standard database as a delta analysis;
   e. value-added mapping of the imported raw content file according to the provided standard schema and the delta analysis to create a mapped content;
   f. publishing the mapped content as a rich-content repository, and g. providing a graphical user interface for the user to direct performing steps a. through f.

2. The method of claim 1, wherein said importing step (c.) further comprises the step of:
   c.1 selecting the content file to import;
   c.2 mapping the incoming schema file to the standard schema, and
   c.3 manually appending a branch of the incoming schema file to a branch of the standard schema.

3. The method of claim 1, wherein said publishing step (f.) further comprises the step of:
   (f.1) creating the mapped content in an environment of the user.

4. The method of claim 1, wherein said importing step (c.) further comprises the step of:
   c.4 importing the content file having a format selected from the group consisting of Microsoft.RTM. Access, Microsoft.RTM. Excel, comma-separated-variables (CSV) and eXtensible Markup Language (XML).

5. The method of claim 1, wherein: said mapping step (e.) further comprises the steps of:
   e.1 mapping the incoming item file structure to the standard database structure,
   e.2 building custom rules to validate the at least one incoming item,
   e.3 defining special characters to be removed from the at least one incoming item when performing the importing step, and
   e.4 defining replacements for specific words in the at least one incoming item; and the importing step (c.) further comprises the steps of;
   c.5 removing the defined special characters from the at least one incoming item, and
   c.6 replacing the specific words with the defined replacements in the at least one incoming item.

6. The method of claim 1, further comprising the steps of:
   h. using the provided graphical user interface by a user to direct steps (a.)-(g.); and
   i. tracking an importing step by at least one of an ID of a user directing the importing step, a date of the importing step and a time of the importing step.

7. The method of claim 1, wherein said determining step (d.) further comprises the steps of:
   d.1 identifying/reporting differences between an existing catalog item and an incoming item update;
   d.2 providing a list comprising a new incoming item and an incoming item that is an update to an existing item as a comparative report of "before and after update".

8. The method of claim 7, wherein: said determining step (d.) further comprises performing one of the steps of:
   d.3 appending a new incoming item to a specified schema branch, and d.4 overwriting an existing item with an incoming update.

9. The method of claim 1, wherein said mapping step (e.) further comprises the steps of:
   e.5 spell-checking a product detail against a dictionary having at least one word and
   e.6 adding a custom word to the dictionary.

10. The method of claim 1, wherein said mapping step (e.) further comprises the step of:
    e.7 changing case on a text field of an item.

11. The method of claim 1, wherein said mapping step (e.) further comprises the step of:
    e.8 performing a find/replace for a given text on a pre-determined range of items.

12. The method of claim 1, wherein said mapping step (e.) further comprises the steps of:
    e.9 providing a set of standard supplier and manufacturer names; and
    e.10 validating a supplier and a manufacturer name of an item against the provided set of standard supplier and manufacturer names.

13. The method of claim 1, wherein said mapping step (e.) further comprises the step of:
    e.11 data mining of an imported item by performing one or more of the steps of;
    e.11.1 editing the item;
    e.11.2 attaching an image to the item; and
    e.11.3 applying a normalization function to the item.

14. The method of claim 13, wherein the normalization function is at least one of spell check, find/replace, change case, and validate supplier name.

15. The method of claim 1, wherein said mapping step (e.) further comprises the step of:
    e.12 defining and maintaining at least one accessory item for an other item by performing one or more of the steps of;
    e.12.1 identifying with an item identification an existing item as an accessory;
    e.12.2 associating the accessory with an other existing item through the accessory item identification, said association including a quantity associated and a type of association for the accessory with the other existing item;
    e.12.3 providing for maintenance of the association including adding, editing and deleting an association of an accessory with an item.

16. The method of claim 1, wherein said mapping step (e.) further comprises the steps of:
    e.13 associating at least one user-specified keyword with at least one synonym therefor; and
    e.14 adding the associated synonym to search criteria whenever the keyword is used in a text search.

17. The method of claim 1, wherein said publishing step (f) further comprises the step of:
    f.2 initiating at least one stored procedure to publish at least one rich-content repository in at least one of a pre-defined output format.

18. The method of claim 1, wherein said publishing step (f) further comprises the step of:
    f.3 executing a stored procedure to migrate and the update rich-content repository in accordance with at least one requirement of a Catalog Web application.

19. A system for carrying out the method for creating a rich-content repository under a user direction recited in claim 1, comprising: a host system; at least one database within said host system that stores the at least one of a published rich-content repository and a syndicated rich-content repository; a computer processor within said host system configured to access the at least one of a published rich-content repository and a syndicated rich-content repository stored on the at least one database; and a user input/output interface within said host system interfaced to said computer processor and said rich-content repository for a user to interactively direct the processor to access the rich-content repository,
    wherein access to at least one of a published and syndicated rich-content repository are provided.

20. The system of claim 19, further comprising a network interface to the host system configured to enable access over the network to the least one of a published rich-content repository and a syndicated rich-content repository stored on the at least one database.

21. The system of claim 20, further comprising a remote interface to access over the network via the network interface the least one of a published rich-content repository and a syndicated rich-content repository stored on the at least one database.

22. The system of claim 21, wherein said remote interface is a remote computer system.

23. The system of claim 21, wherein the user input/output interface is the remote interface.

24. The system of claim 21, wherein said network is the Internet.

25. The system of claim 24, wherein the user input/output interface is a web browser.

26. A method for providing access to at least one of a published and syndicated rich-content repository created using the method for creating a rich-content repository under a user direction according to claim 1, comprising the steps of: providing a host system; providing the rich-content repository as a plurality of item information defined by a standard schema wherein the standard schema is defined by a common language; providing at least one database within said host system that stores the at least one of a published rich-content repository and a syndicated rich-content repository defined by the standard schema; providing a computer processor within said host system configured to access the at least one of a published rich-content repository and a syndicated rich-content repository stored on the at least one database; and providing a user input/output interface within said host system interfaced to said computer processor and said rich-content repository for a user to interactively direct the processor to access the rich-content repository.

27. The method of claim 26, further comprising the step of providing a network interface to the host system configured to enable access over a network to the at least one of a published rich-content repository and a syndicated rich-content repository stored on the at least one database.

28. The method of claim 27, further comprising the step of providing access over the network via the network interface to the least one of a published rich-content repository and a syndicated rich-content repository stored on the at least one database.

29. The method of claim 28, further comprising the steps of: providing said user input/output interface at a remote site; and interfacing said remote user input/output interface over a network via the network interface to the host system.

30. The method of claim 29, wherein the network interface is the Internet.

31. The method of claim 30, wherein the user input/output interface is a web browser.

32. The method of claim 26, wherein the network interface is the Internet.

33. The method of claim 32, wherein the user input/output interface is a web browser.

34. The method of claim 27, wherein the network interface is the Internet.

35. The method of claim 34, wherein the user input/output interface is a web browser.

36. The method of claim 28, wherein the network interface is the Internet.

37. The method of claim 36, wherein the user input/output interface is a web browser.

38. A method for creating a second rich-content repository from a first single rich-content repository obtained by carrying out the method for creating a rich-content repository of claim 1, further comprising the steps of:
selecting at least one item and a corresponding schema from the first rich-content repository;
extracting the selected at least one item and the corresponding schema;
and creating the second rich-content repository from the extracted at least one item and the corresponding schema.

39. The method of claim 38, wherein the creating step further comprises the steps of: creating a view of the first repository as the selected at least one item and a corresponding schema; and said creating step comprises creating the second repository as a virtual repository by accessing only the created view of the first repository.

40. A method of publishing a subset of a rich-content repository obtained by carrying out the method for creating a rich-content repository under a user direction of claim 1, comprising the steps of:
receiving a request for a publication of at least part of the repository;
subsetting the repository in accordance with the received request; publishing the subset; and providing access to the subset.

41. A method of providing access to a rich-content repository obtained by carrying out the method for creating a rich-content repository under a user direction of claim 1 comprising the steps of: providing network access to the rich-content repository as a service; providing network access to the rich-content repository via an application program; and providing an interface to the rich-content repository via an application program interface (API).

42. The method in claim 41, wherein the application is one of an eProcurement application, a navigation system, a content browser application, a fulfillment system, a requisition system, and a content search engine.

43. The method of claim 41, wherein when the application provided is an eProcurement application, said eProcurement application is selected from the group consisting of Ariba, Procure+, SAP, and PeopleSoft.

44. A method for defining and maintaining a rich-content repository of rich-content items, comprising the steps of: providing a referencing schema definition having a tree-like schema class structure including a plurality of schema branches for a rich-content repository comprising at least one rich-content item definition specifying a manufacturer; creating and maintaining at least one rich-content item corresponding to said at least one item definition; performing one of a copy and a move of said at least one rich-content item across a plurality of schema branches; attaching at least one logo to the manufacturer specification of the at least one item definition; including an indicator with the at least one logo that the at least one attached logo is to be displayed whenever the manufacturer is displayed; attaching an image and an automatically generated thumbnail to an item; navigating the rich-content repository according to the referencing schema while viewing individual items associated with each class; searching the rich-content repository for at least one item having at least one specified keyword; and locating a specific set of items using parametric search inputs.

45. A method for defining and maintaining a rich-content repository of rich-content items, comprising the steps of: providing a referencing schema definition having a tree-like schema class structure including a plurality of schema branches for a rich-content repository comprising at least one rich-content item definition; creating and maintaining at least one rich-content item corresponding to said at least one item definition; performing one of a copy and a move of said at least one rich-content item across a plurality of schema branches; attaching an image and an automatically generated thumbnail to an item; navigating the rich-content repository according to the referencing schema while viewing individual items associated with each class; searching the rich-content repository for at least one item having at least one specified keyword: and locating a specific set of items using parametric search inputs.

46. A system for creating and maintaining a rich-content repository, comprising: a host system; at least one database within said host system for storing the rich-content repository having a plurality of item information defined by a standard schema wherein the standard schema is defined by a common language; a computer processor within said host system configured to create and maintain the rich-content repository; and a user input/output interface within said host system interfaced to said computer processor and said rich-content repository for a user to interactively monitor and direct the processor in creation and maintenance of the rich-content repository.

47. The system of claim 46, wherein said computer processor is further configured to: import a raw content file comprising an incoming raw content file and an incoming schema file defining the incoming raw content file; perform a delta analysis to determine at least one difference between the incoming raw content file and the standard schema; map the imported raw content file to a mapped file according to the standard schema and the delta analysis; update the rich-content repository with the modified mapped file.

48. The system of claim 47, wherein the computer processor is further configured to publish at least a part of the rich-content repository as at least a second rich-content repository.

49. The system of claim 48, wherein the computer processor is further configured to syndicate at least a part of the rich-content repository.

50. The system of claim 48, wherein said user input/output interface is configured to allow a user to: monitor the progress of at least one of said import, delta analysis, mapping, update, publish and syndication functions; and modify the mapping by predetermined at least one of a word substitution, a spell check, a pattern matching substitution, an accessory, a synonym substitution, a user profile, a supplier information, a product view, a pricing information, and a quality approval.

51. The system of claim 47, further comprising at least one remote communication facility interfaced via a network to said host system to transmit at least one said raw content file from the remote communication facility over the network to the host system.

52. A method for creating and maintaining a rich-content repository, comprising the steps of:

providing a host system;

defining the rich-content repository as a plurality of item information defined by a standard schema wherein the standard schema is defined by a common language;

providing at least one database within the host system for storing the rich-content repository as defined; providing a computer processor within the host system configured to create and maintain the rich-content repository; the processor creating and storing the rich-content repository as defined in the database; providing a user input/output interface within the host system interfaced to said computer processor and said rich-content repository; and the user interactively monitoring and directing the creation and maintenance of the rich-content repository by the computer processor and the storage thereof in the at least one database.

53. The method of claim 52, further comprising the steps of: importing a raw content file comprising an incoming raw content file and an incoming schema file defining the incoming raw content file; performing a delta analysis to determine at least one difference between the incoming raw content file and the standard schema; mapping the imported raw content file to a mapped file according to the standard schema and the delta analysis; and updating the rich-content repository with the modified mapped file.

54. The method of claim 53, further comprising the step of publishing at least a part of the rich-content repository as at least a second rich-content repository.

55. The method of claim 54, further comprising the step of syndicating at least a part of the rich-content repository.

56. The method of claim 55, further comprising the steps of: monitoring the progress of at least one of said importing, performing delta analysis, mapping, updating, publishing and syndicating steps; and modifying the mapping step by a predetermined at least one of a word substitution, a spell check, a pattern matching substitution, an accessory, a synonym substitution, a user profiles, a supplier information, a product view, a pricing, and a quality approval.

57. The method of claim 53, further comprising the steps of: providing at least one remote communication facility interfaced via a network to said host system; and transmitting at least one said raw content file from the remote communication facility over the provided network to the host system.

* * * * *